US012600563B2

(12) United States Patent

Foster

(10) Patent No.: US 12,600,563 B2
(45) Date of Patent: Apr. 14, 2026

(54) HEAVY DUTY CONTAINER

(71) Applicant: Rehrig Pacific Company, Los Angeles, CA (US)

(72) Inventor: Derick Foster, Cumming, GA (US)

(73) Assignee: Rehrig Pacific Company, Monterey Park, CA (US)

(*) Notice: Subject to any disclaimer, the term of this patent is extended or adjusted under 35 U.S.C. 154(b) by 214 days.

(21) Appl. No.: 17/066,614

(22) Filed: Oct. 9, 2020

(65) Prior Publication Data

US 2021/0107735 A1 Apr. 15, 2021

Related U.S. Application Data

(60) Provisional application No. 62/914,407, filed on Oct. 11, 2019.

(51) Int. Cl.

| | |
|---|---|
| ***B65F 1/12*** | (2006.01) |
| ***B65D 88/02*** | (2006.01) |
| ***B65D 88/12*** | (2006.01) |
| ***B65F 1/08*** | (2006.01) |

(52) U.S. Cl.

CPC ............ *B65F 1/122* (2013.01); *B65D 88/025* (2013.01); *B65D 88/128* (2013.01); *B65F 1/085* (2013.01); *B65D 2588/12* (2013.01)

(58) Field of Classification Search

CPC ...... B65F 1/08; B65F 1/04; B65F 1/02; B65F 1/122; B65D 88/1675; B65D 16/18; B65D 88/128

USPC .......................................................... 220/751

See application file for complete search history.

(56) References Cited

U.S. PATENT DOCUMENTS

| | | | | | |
|---|---|---|---|---|---|
| 984,951 | A * | 2/1911 | Macon | B65F 1/08 209/374 |
| 3,669,485 | A | 6/1972 | Stihler | |
| 3,823,973 | A | 7/1974 | Ramer | |
| 4,335,828 | A | 6/1982 | Robinson et al. | |
| 4,375,265 | A | 3/1983 | van de Wetering et al. | |
| 4,550,849 | A * | 11/1985 | Adsit | B65F 1/122 220/908 |
| 4,630,750 | A | 12/1986 | Hughes | |
| 4,726,616 | A | 2/1988 | Schmidt | |
| 4,741,658 | A | 5/1988 | Zelinka et al. | |
| 4,750,638 | A | 6/1988 | Sosower | |
| 4,807,774 | A * | 2/1989 | Karpisek | B65D 19/12 220/4.28 |
| 4,819,582 | A | 4/1989 | Lichvar | |
| 4,892,220 | A | 1/1990 | Foos | |
| 4,949,866 | A | 8/1990 | Sanders | |
| 4,955,495 | A | 9/1990 | Ruebesam | |
| 5,038,962 | A | 8/1991 | Ruebesam | |

(Continued)

FOREIGN PATENT DOCUMENTS

| | | | |
|---|---|---|---|
| EP | 3092178 | B1 | 11/2016 |
| GB | 2522091 | A | 7/2015 |

*Primary Examiner* — Anthony D Stashick
*Assistant Examiner* — Raven Collins
(74) *Attorney, Agent, or Firm* — Carlson, Gaskey & Olds, P.C.

(57) ABSTRACT

A heavy duty container includes a plastic base having a plurality of vertical corrugations. A separate plastic liner is placed inside the base. The liner is smooth to allow materials to fall out easy and not catch or build up in corners. The container can be moved with a fork lift and serviced with a front loader truck.

37 Claims, 28 Drawing Sheets

(56) References Cited

U.S. PATENT DOCUMENTS

| | | | | |
|---|---|---|---|---|
| 5,076,458 | A | 12/1991 | Weiner et al. | |
| 5,118,005 | A | 6/1992 | Onodera | |
| 5,156,296 | A | 10/1992 | Vasquez | |
| 5,183,180 | A | 2/1993 | Hawkins et al. | |
| 5,222,536 | A | 6/1993 | Hodgon et al. | |
| 5,261,562 | A | 11/1993 | Prout et al. | |
| 5,330,071 | A | 7/1994 | Parker | |
| 5,465,865 | A * | 11/1995 | Coombes | B65D 21/0209 220/601 |
| 5,673,811 | A | 10/1997 | Dickinson et al. | |
| 5,967,361 | A | 10/1999 | Darnell | |
| 6,280,001 | B1 | 8/2001 | Parker et al. | |
| 6,401,983 | B1 * | 6/2002 | McDonald | B65D 88/128 222/561 |
| 6,632,064 | B1 | 10/2003 | Walker et al. | |
| 6,918,508 | B2 | 7/2005 | Hwang | |
| 7,100,791 | B2 | 9/2006 | Berger | |
| 7,198,166 | B2 | 4/2007 | Sholinder | |
| 7,237,689 | B2 | 7/2007 | Maggio, Sr. et al. | |
| D564,168 | S | 3/2008 | Larin | |
| 7,762,565 | B2 * | 7/2010 | Hatamian | B65F 1/1468 220/759 |
| 7,784,642 | B2 | 8/2010 | Gavin et al. | |
| 8,141,921 | B2 | 3/2012 | Apps et al. | |
| D657,105 | S | 4/2012 | Martheenal | |
| 8,322,561 | B2 | 12/2012 | Ramsey et al. | |
| 8,449,008 | B2 | 5/2013 | Apps et al. | |
| 8,453,872 | B1 | 6/2013 | Holmes | |
| 8,631,940 | B2 | 1/2014 | Hay et al. | |
| 8,720,686 | B1 | 5/2014 | Shuman | |
| 8,770,641 | B2 | 7/2014 | Hassell et al. | |
| 8,833,593 | B2 * | 9/2014 | Martheenal | B65F 1/1468 220/495.11 |
| 8,875,937 | B2 | 11/2014 | Hay et al. | |
| 9,056,717 | B2 | 6/2015 | Lobban | |
| 9,273,485 | B2 | 3/2016 | Goode | |
| 9,387,984 | B1 | 7/2016 | Lovett | |
| 9,567,159 | B2 | 2/2017 | Loney et al. | |
| 9,878,846 | B2 | 1/2018 | Strom | |
| 9,908,694 | B2 * | 3/2018 | Christenson | B65F 1/122 |
| 10,144,583 | B2 | 12/2018 | Monaco et al. | |
| D845,577 | S | 4/2019 | Foster | |
| 10,442,619 | B2 | 10/2019 | Loney et al. | |
| D868,410 | S | 11/2019 | Schwalbach | |
| D872,323 | S | 1/2020 | Schmidt | |
| 10,661,983 | B2 | 5/2020 | Monaco et al. | |
| 2001/0027826 | A1 | 10/2001 | Carpenter | |
| 2004/0124190 | A1 * | 7/2004 | Beyer | B65D 88/56 220/1.5 |
| 2006/0045680 | A1 | 3/2006 | d'Arc Lorenz et al. | |
| 2006/0060593 | A1 | 3/2006 | Maggio, Sr. et al. | |
| 2007/0023319 | A1 * | 2/2007 | Honkawa | A47F 3/142 206/600 |
| 2008/0135556 | A1 | 6/2008 | Bontrager et al. | |
| 2009/0179444 | A1 | 7/2009 | Apps et al. | |
| 2011/0036853 | A1 * | 2/2011 | Ramsey | B65D 25/02 220/676 |
| 2011/0036854 | A1 | 2/2011 | Baltz | |
| 2012/0043327 | A1 * | 2/2012 | Baltz | B65F 1/004 220/315 |
| 2012/0055834 | A1 | 3/2012 | Hay et al. | |
| 2012/0132662 | A1 | 5/2012 | Apps et al. | |
| 2014/0091088 | A1 * | 4/2014 | Hay | B65F 1/02 220/676 |
| 2014/0314530 | A1 | 10/2014 | Strom | |
| 2018/0257858 | A1 * | 9/2018 | Apps | B65F 1/02 |

* cited by examiner

HEAVY DUTY CONTAINER

BACKGROUND

Food waste from restaurants or other organic material can be particularly heavy in part because it contains a lot of fluids. Traditional metal dumpsters are often not water-tight, so the fluids from the organic material may leak onto the ground. Further metal dumpsters have areas where food waste can get trapped when the dumpster is inverted, resulting in bad odors from the decaying organic material. Organic waste in particular is very corrosive to metal dumpsters.

SUMMARY

A heavy duty container is provided to store organic material such as food waste from restaurants. The container includes a plastic base with vertical corrugations and a plastic liner to resist any type of decay form the materials going inside of it. The strength of the part comes from the outer base unit that consist of corrugations placed in key areas to keep the container from bulging under load. The interior is a separate liner that is completely smooth to allow materials to fall out easy and not catch or build up in corners. The container can be moved with a fork lift and serviced with a front loader truck. In one embodiment, a metal frame further reinforces the container.

DETAILED DESCRIPTION

Figure 1:
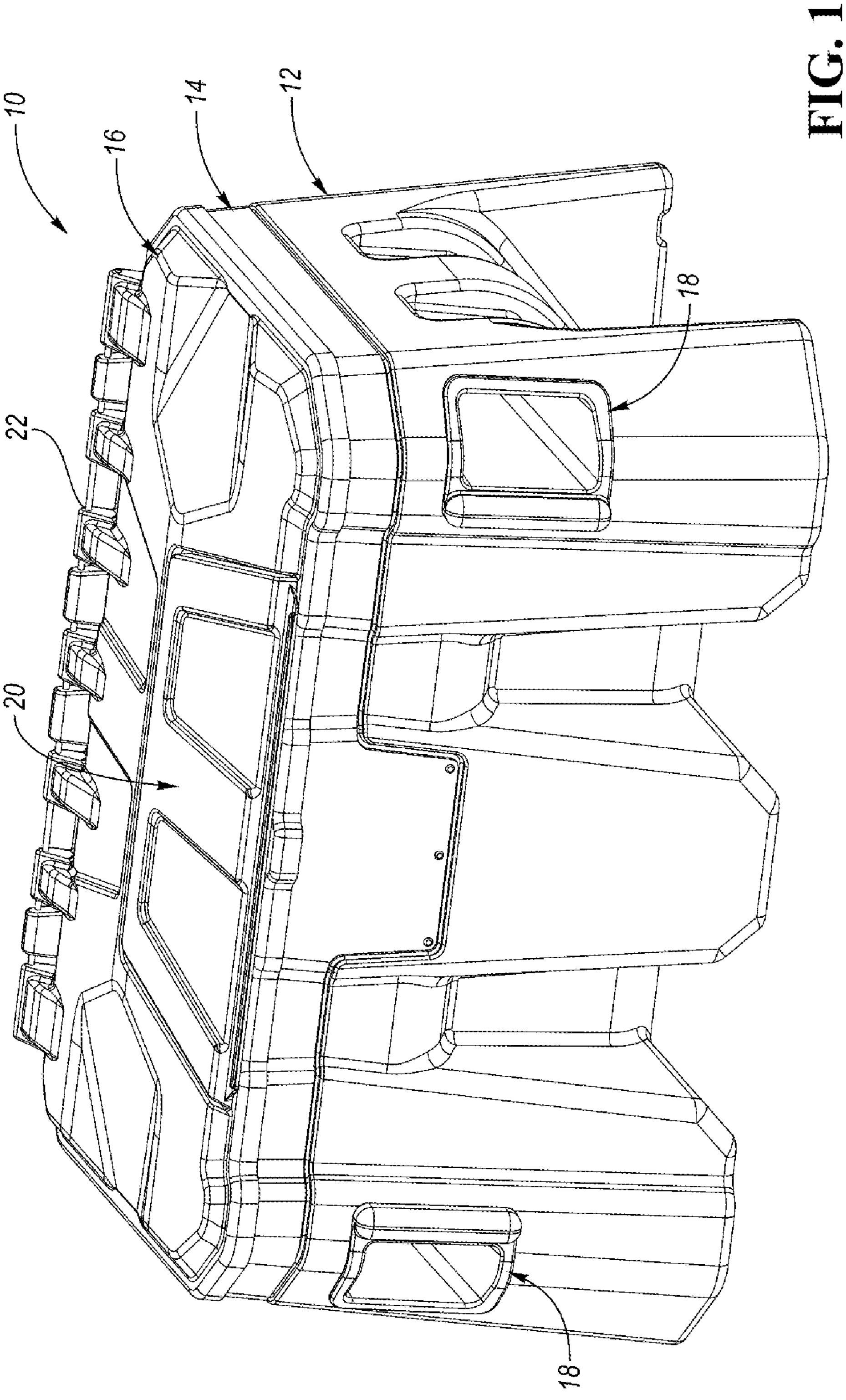
FIG. 1 is a perspective view of a container according to a first embodiment.

A container 10 according to a first embodiment is shown in FIGS. 1-21. Referring to FIG. 1, the container 10 includes a base 12 supporting a liner 14. An opening to the liner 14 and base 12 is selectively covered by a lid 16 having a sub-lid 20 covering a smaller opening therein. The lid 16 is hingeably connected to the base 12 by a hinge assembly 22. A pair of sleeves 18 reinforce fork tine openings though the base 12.

Figure 2:
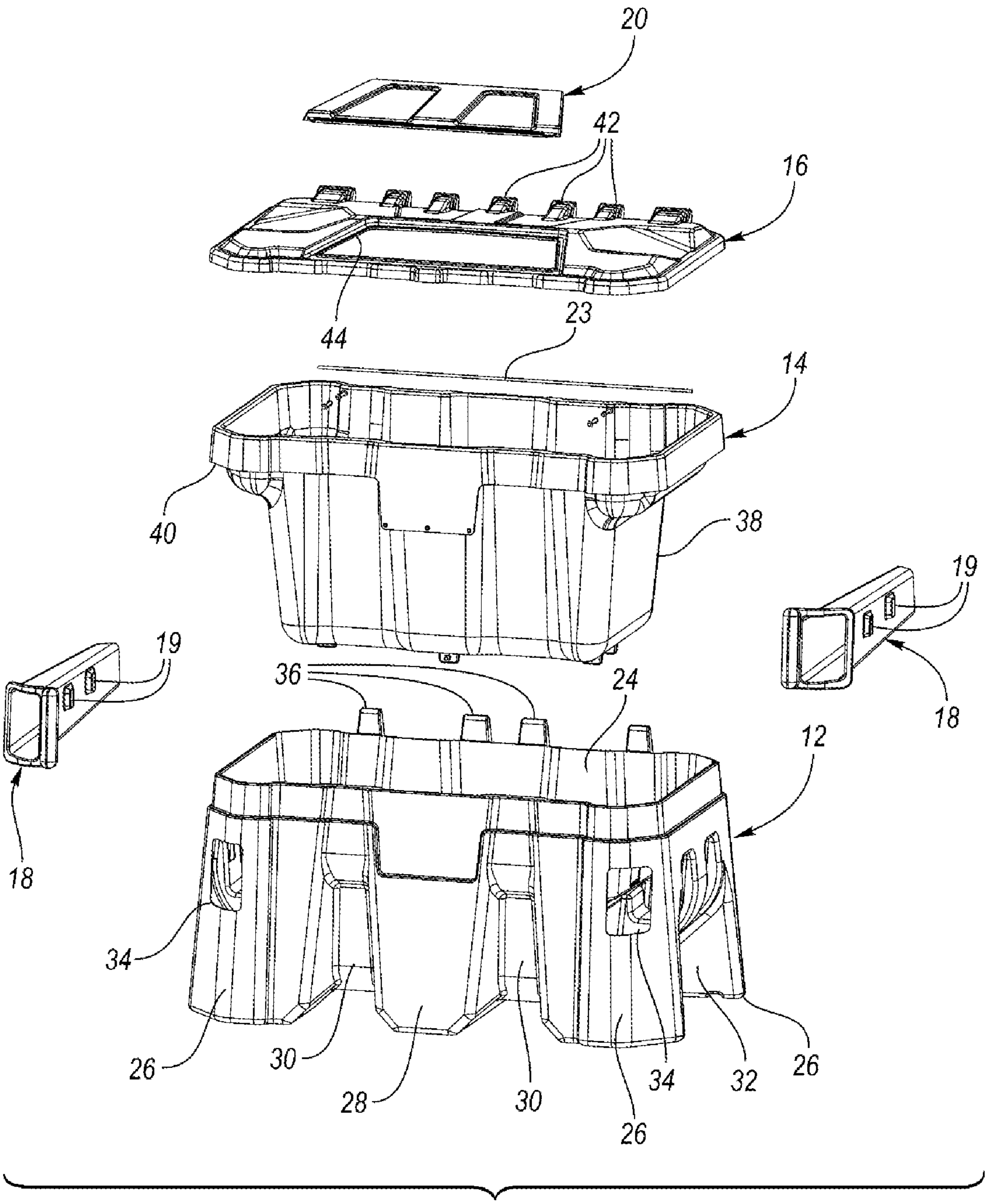
FIG. 2 is an exploded view of the container of FIG. 1.

FIG. 2 is an exploded view of the container 10 of FIG. 1. The base 12 includes a plurality of "corrugations" or alternating projections/recesses about its perimeter, which give it strength to support the weight of the organic material (or other dense material). On the front wall of the base 12 (the rear wall would be the same), the corrugations are vertically oriented and include outer projections 26 and a center projection 28, with recesses 30 between the outer projections 26 and the center projection 28. Lateral recesses 32 are formed between front and rear outer projections 26.

Horizontal sleeve openings 34 are formed through the base 12 through the outer projections 26. Hinge members 36 project upward from a rear upper edge of the base 12. In this embodiment, the base 12 is rotomolded as a single piece of plastic, but other methods could be used.

The liner 14 is formed as a single piece of plastic and includes a base, walls 38 and a lip 40 at upper ends of the walls 38. A hinge pin 22 hingeably connects the hinge members 36 to the complementary hinge members 42 on the lid 16. An opening 44 is formed through the lid 16 and is selectively covered by the sub-lid 20. The sub-lid 20 can be opened by a person who wants to add a small waste item to the container 10. Larger items can be added and the container 10 can be emptied through the main lid 16.

The sleeves 18 are hollow and tapered with directional locking features 19 formed on the outer surfaces thereof. The sleeves 18 may be injection molded from a plastic material or composite tougher than the rest of the container 10.

Figure 3:
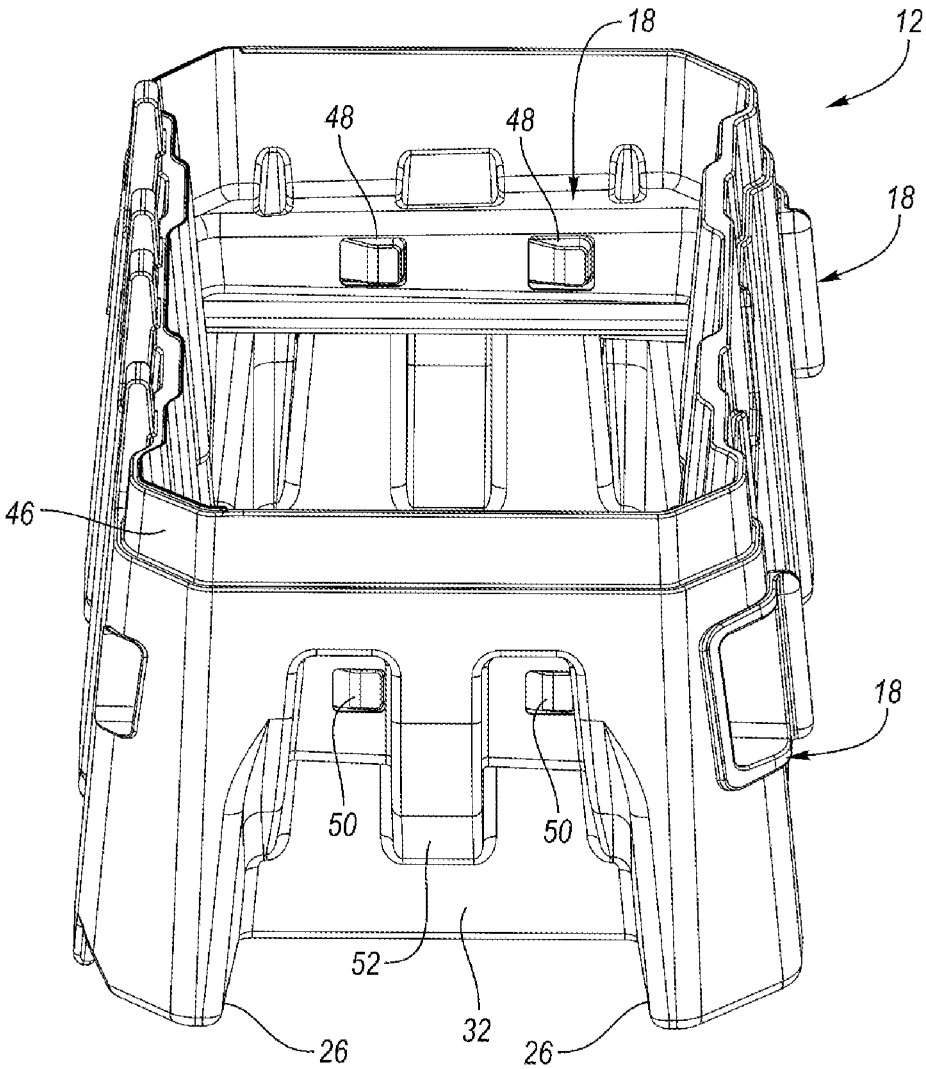
FIG. 3 is a lateral perspective interior view into the base and sleeves of the container of FIG. 1.

FIG. 3 is a lateral perspective interior view into the base 12 with the sleeves 18, but not the liner 14. Each lateral side of the base 12 includes a recess 32 between the projections 26. An upper projection 52 extends downward below the sleeve 18, but not down to the floor. An upper portion 46 of the walls of the base 12 has a reduced width. The base 12 includes interlocking features 48, 50 complementary to the directional locking features 19 of the sleeves 18. The interlocking features 48, 50 are formed on the interior sides and exterior sides of walls defining the sleeve openings 34 (FIG. 2).

Figure 4:
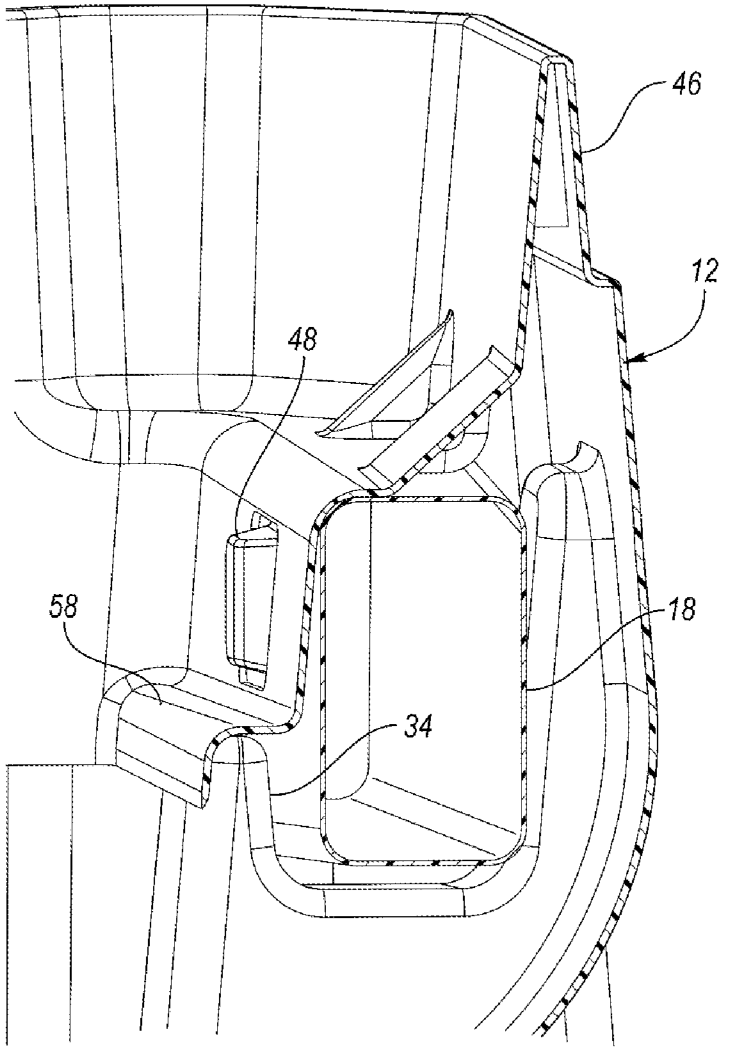
FIG. 4 is a section view through one of the lateral walls of the base and sleeves of FIG. 3.

FIG. 4 is a section view through one of the lateral walls of the base 12 and sleeves 18. The interlocking feature 48 projects into the interior of the container and defines a recess (not shown) inside the sleeve opening 34 for receiving the directional locking feature 19. A ledge 58 is defined by the base 12 inward of the sleeve 18. The ledge 58 and the wall above the sleeve opening 34 partially support the liner 14 (FIG. 2).

Figure 5:
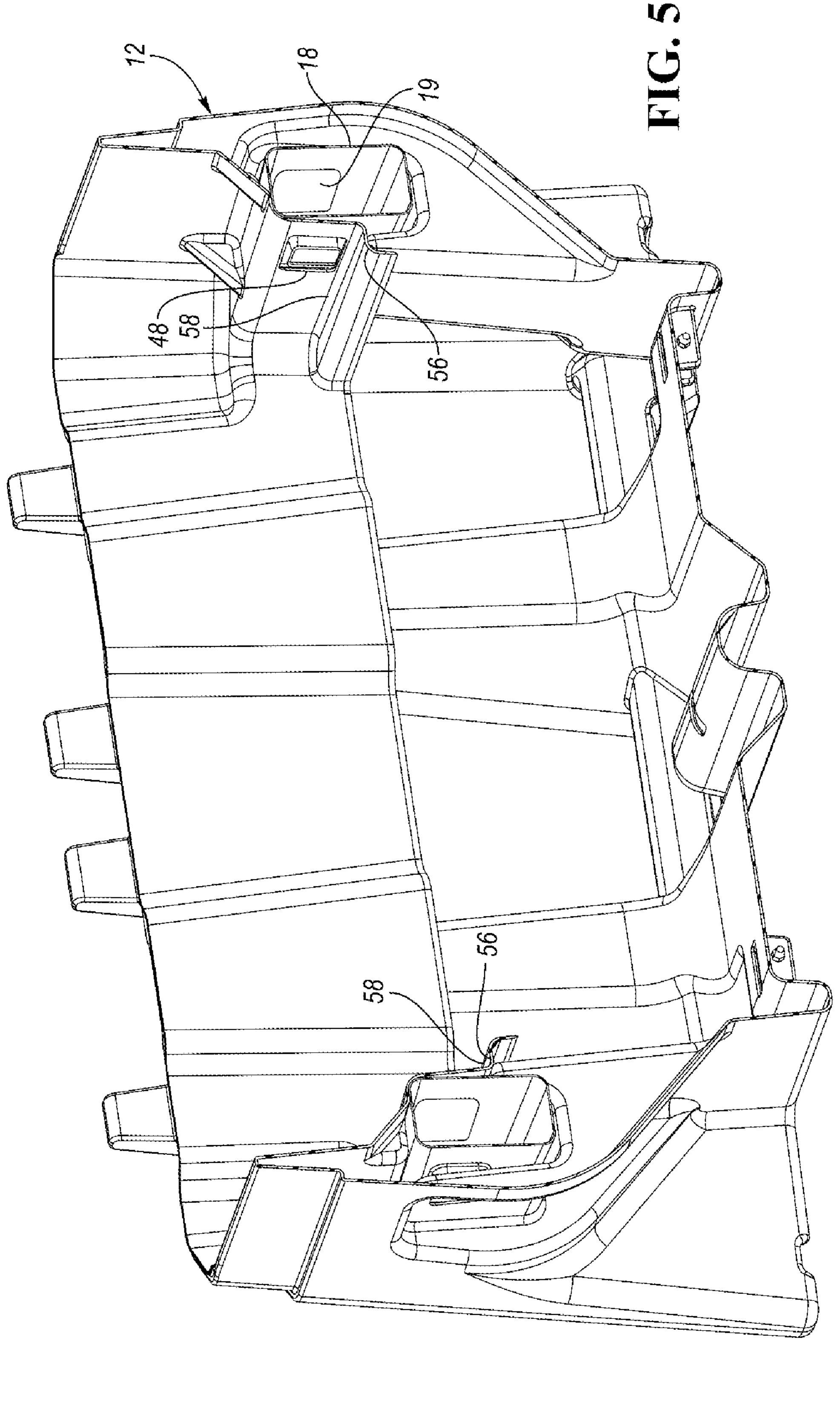
FIG. 5 is an expanded section view of the base and sleeves of FIG. 4.

FIG. 5 is an expanded section view of the base 12 and sleeves 18 of FIG. 4.

Figure 6:
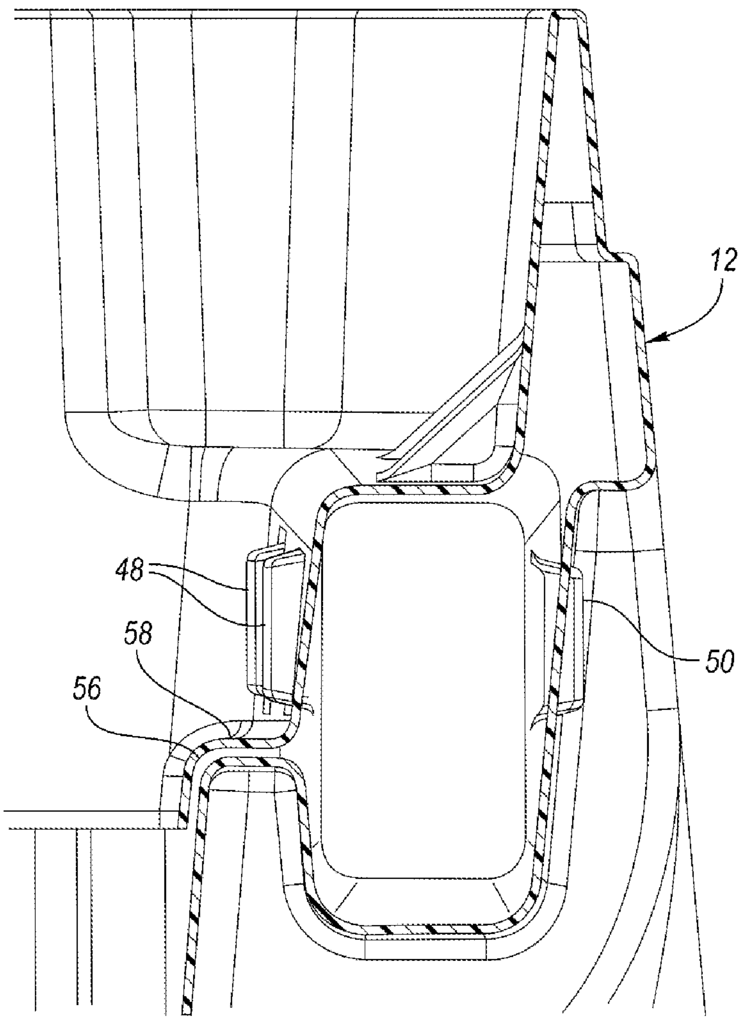
FIG. 6 is a section view through one of the lateral walls of the base and sleeves of the container of FIG. 1.

FIG. 6 is a section view through one of the lateral walls of the base 12 and sleeves 18. The base 12 is generally a double-walled construction, but includes kiss-off areas 56 where the two walls are joined by a rib, such as adjacent the ledge 58, as shown.

Figure 7:
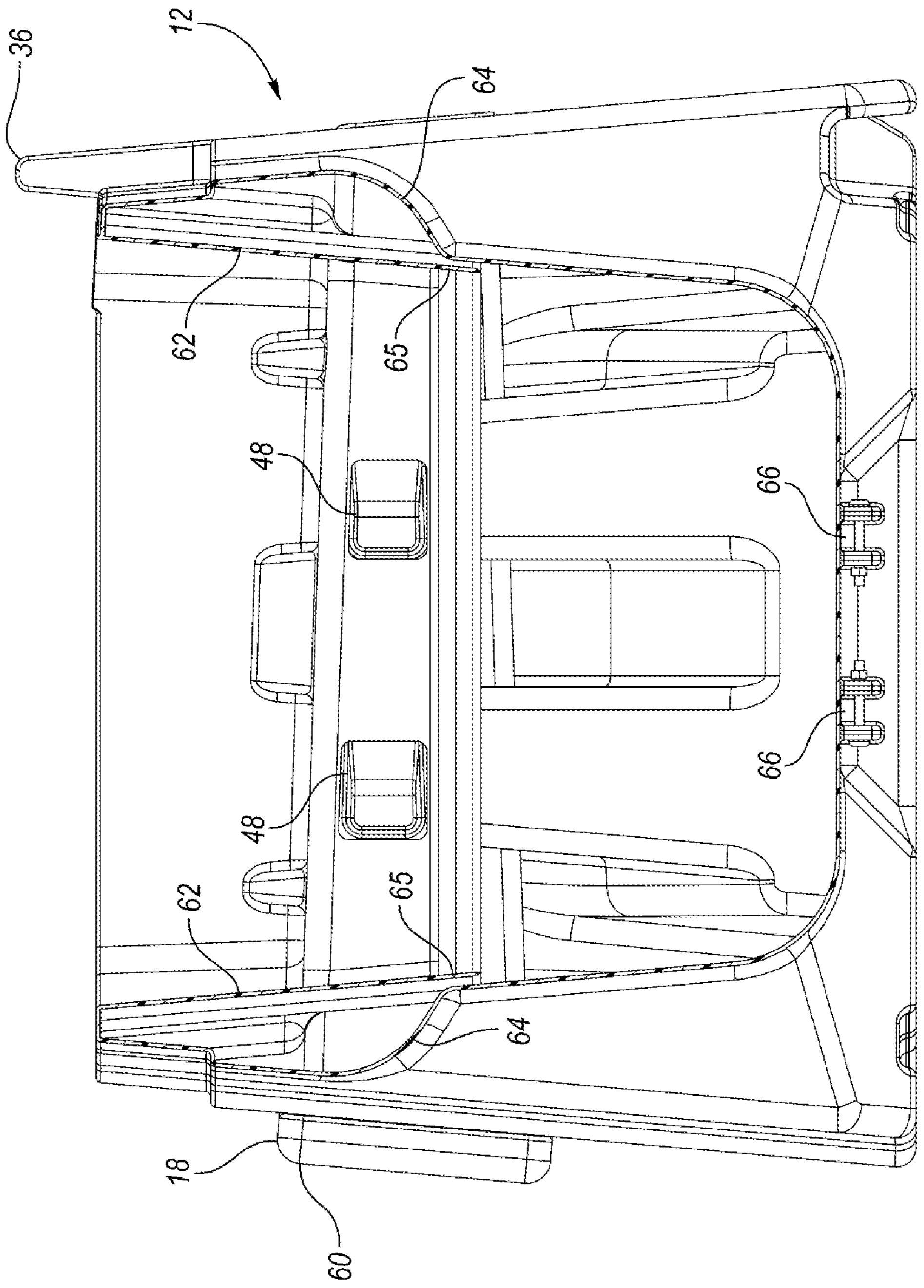
FIG. 7 is a section view into the base and sleeves of the container of FIG. 1.

FIG. 7 is a section view into the base 12 and sleeves 18 without the liner 14. In this portion of the base 12, there is an outer wall 64 and an inner wall 62 which both extend downward from the uppermost edge of the base 12. The inner wall 62 tapers inward and the outer wall 64 tapers outward and then curves inward to a kiss-off 65, a single wall then extends downward to form a bottom wall of the base 12. Connectors 66 at the bottom wall of the base 12 selectively secure the liner 14 to the base 12. The connectors 66 may be bolts, so that the liner 14 can easily be removed from the base 12 if it is damaged.

Figure 8:
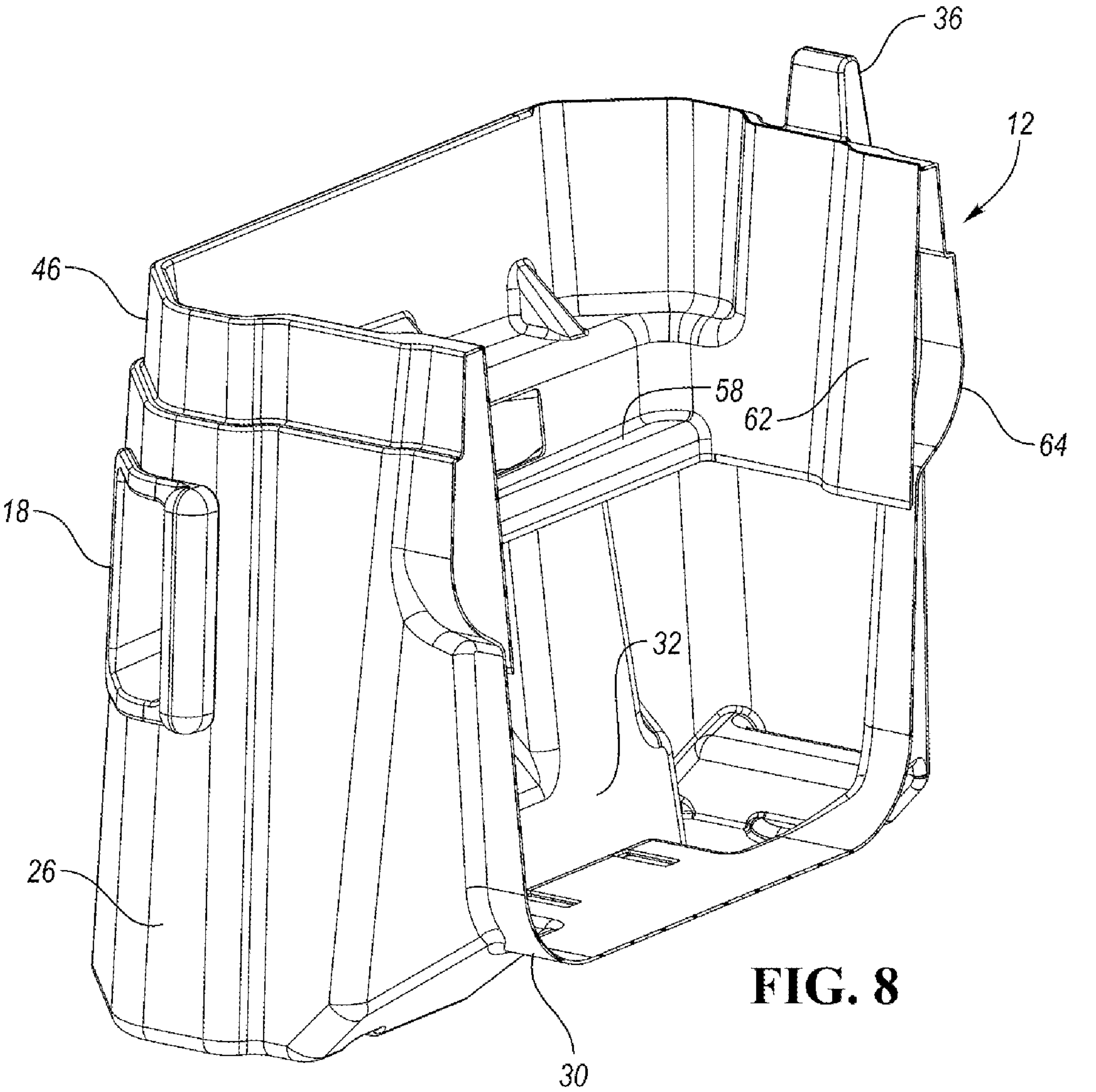
FIG. 8 is a perspective view of the base and sleeve of the container of FIG. 1, broken away along a line from front to back

FIG. 8 is a perspective view of the base 12 and sleeve 18, broken away along a line from front to back.

Figure 11:
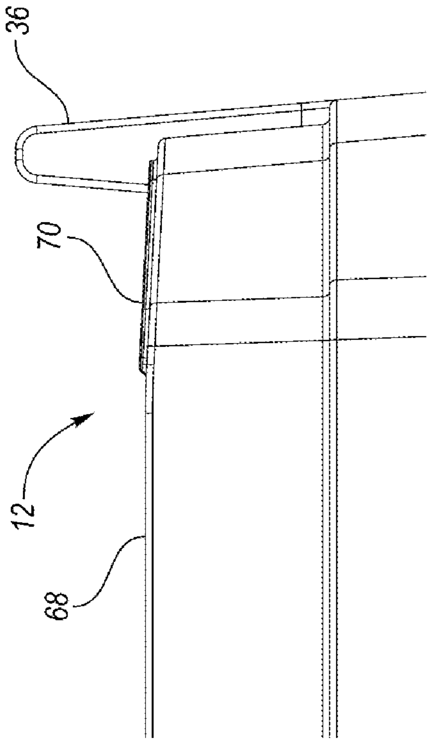
FIGS. 9-11 are enlarged views of the uppermost edge of the rear of the base of the container of FIG. 1.
Figure 10:
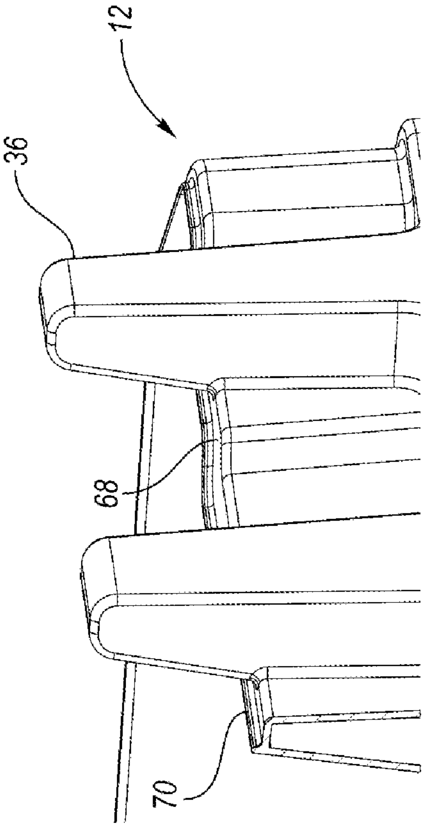
Figure 9:
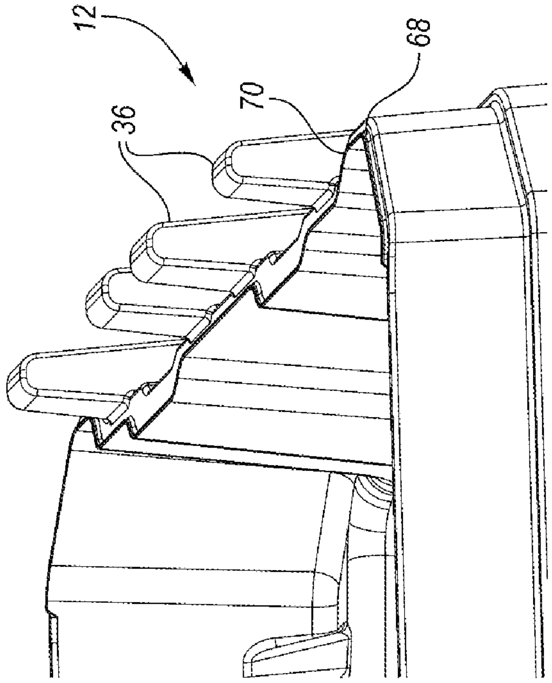

FIGS. 9-11 are enlarged views of the uppermost edge 68 of rear of the base 12. As shown, the upper most edge 68 of the walls of the base 12 are pitched downward at a rear portion (e.g. eight inches) of the base 12. In this rear portion, a rib 70 projects upward from an inner edge of the uppermost edge 68. This prevents rain from entering the base 12 and encourages rain that may contact the uppermost edge of the base 12 outward of the lid 16 (FIG. 1) to drain rearward off the container 10 rather than into the container 10.

Figure 12:
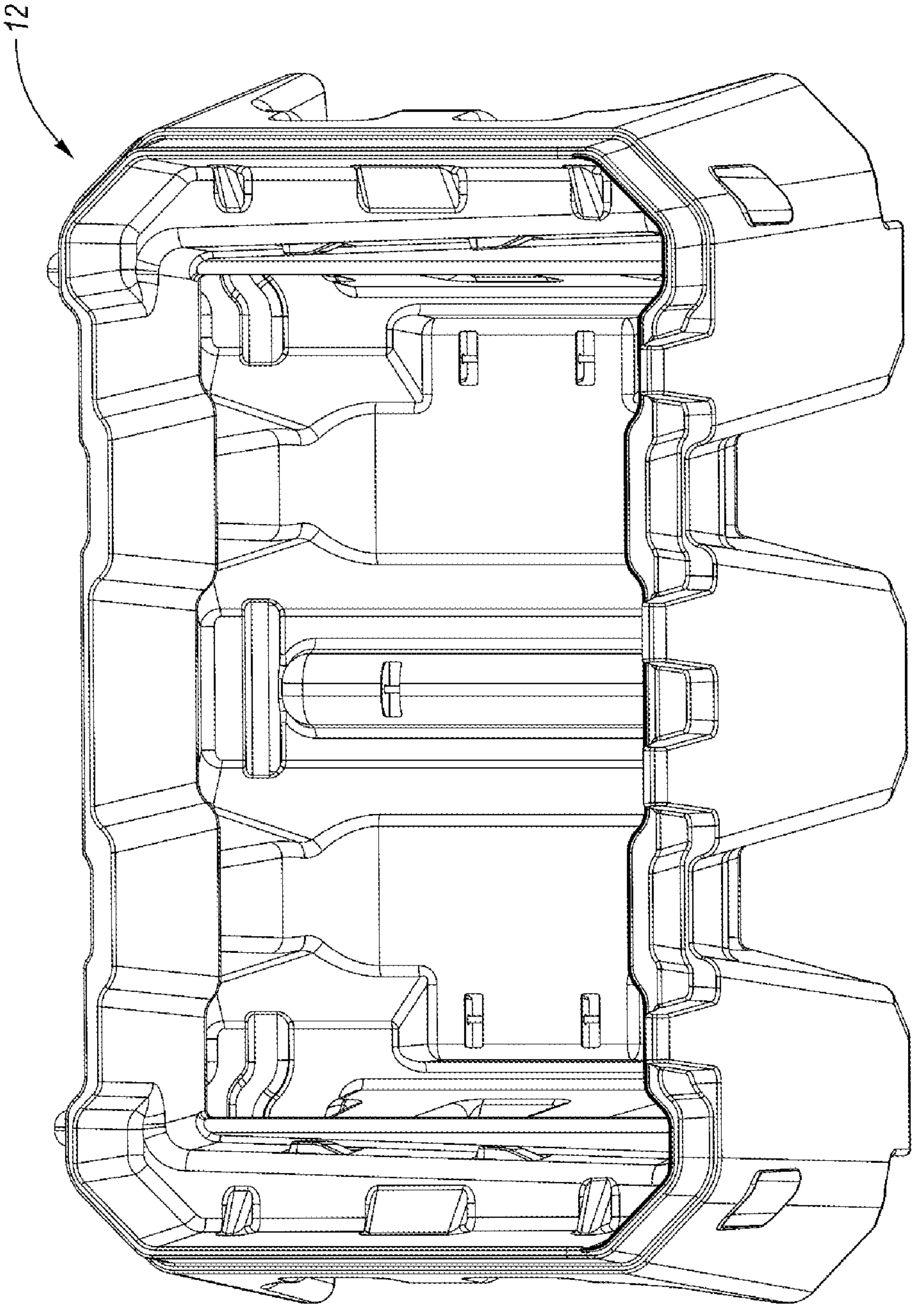
FIG. 12 is a rear perspective view of the base of the container of FIG. 1.
Figure 13:
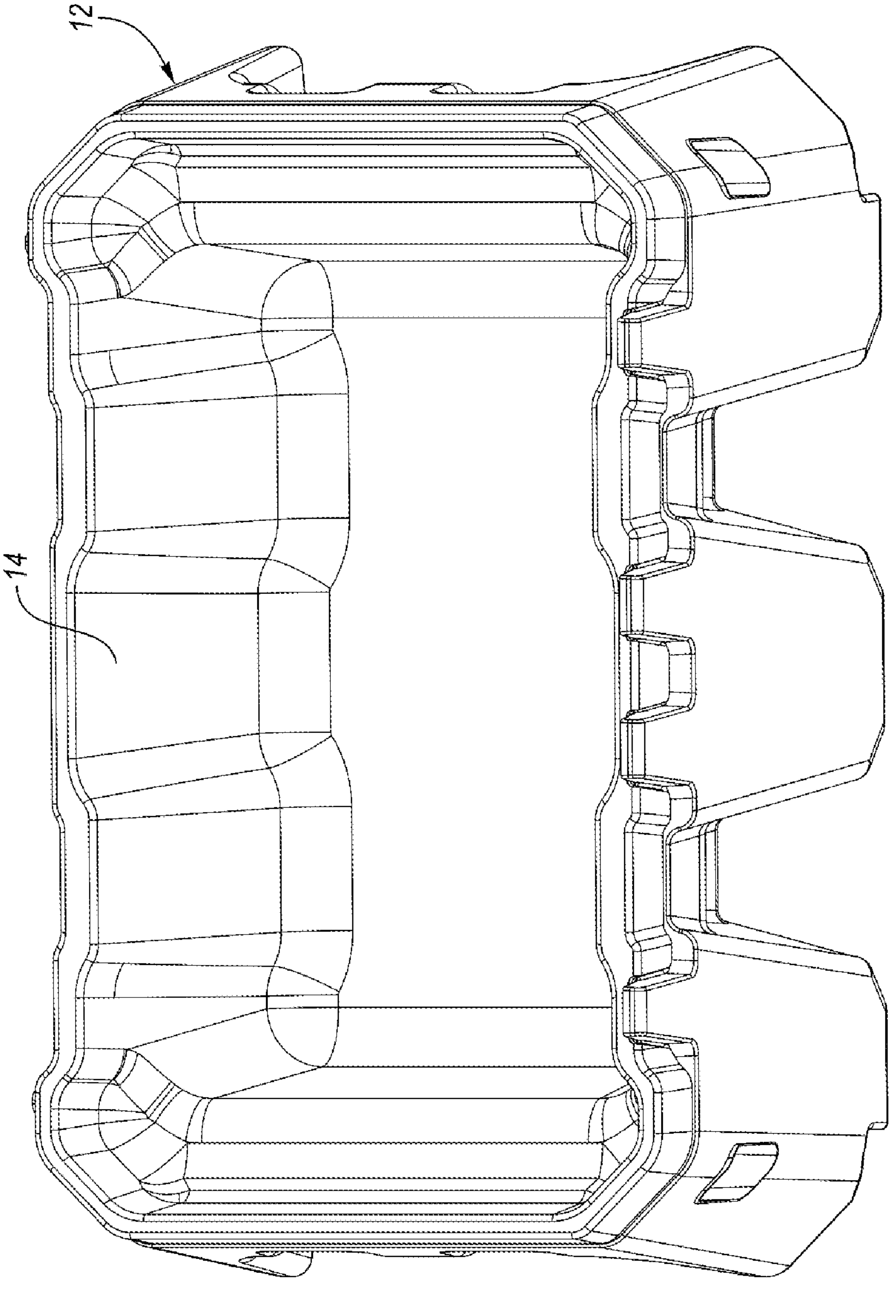
FIG. 13 is a rear perspective view of the base and liner of the container of FIG. 1.

FIG. 12 is a rear perspective view into the base 12 (without the liner 14). FIG. 13 is a rear perspective view of the base 12 and liner 14.

Figure 14:
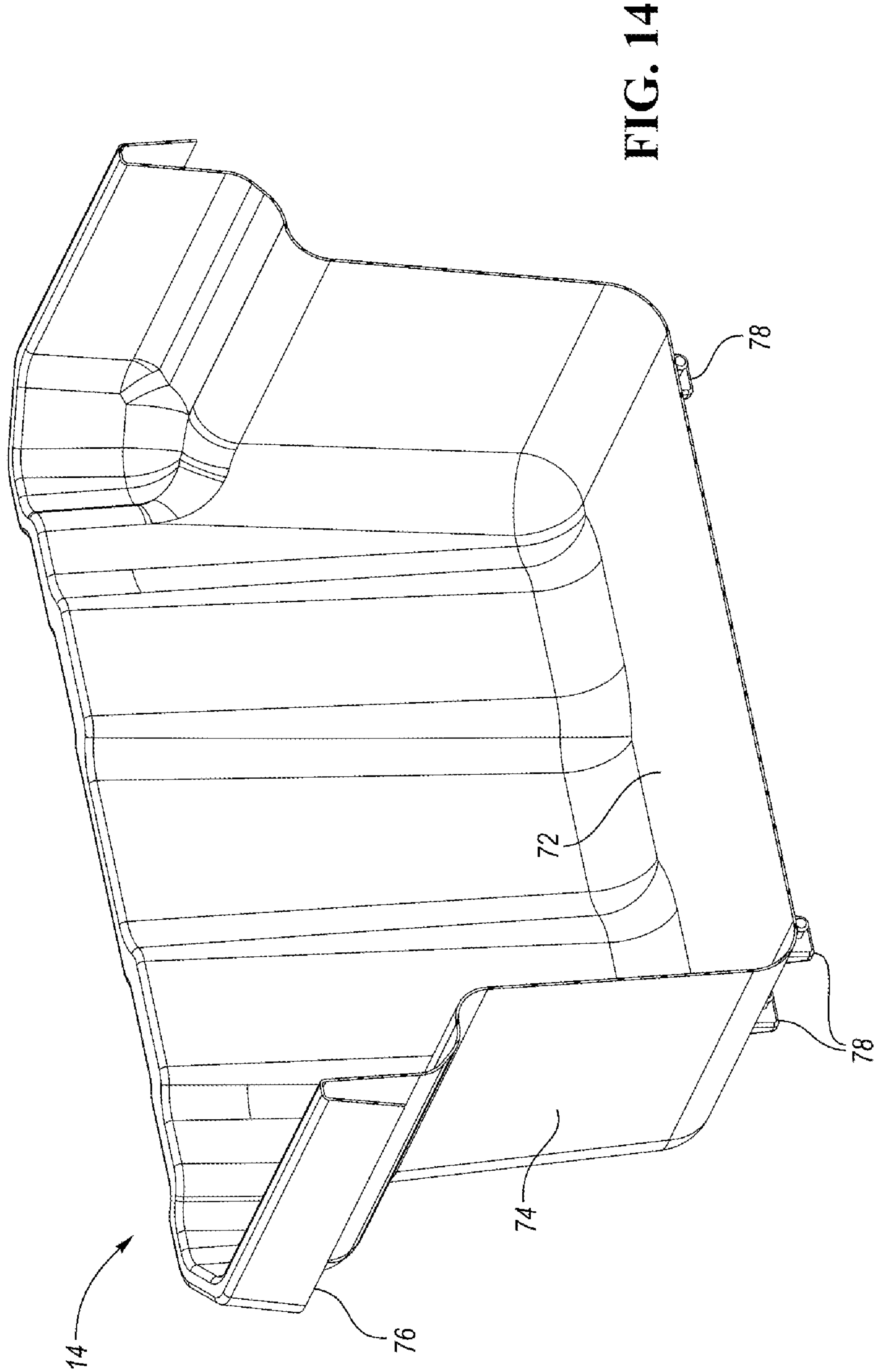
FIG. 14 is a perspective view of the liner of the container of FIG. 1, partially broken away.

FIG. 14 is a perspective view of the liner 14 partially broken away. The liner 14 is formed as a single piece of plastic of plastic without openings therethrough. The liner 14 includes a base wall 72, side walls 74, and a large lip 76 projecting outward and downward from an uppermost edge of the side walls 74. Connectors 78 for connecting to the base 12 are formed integrally on a lower surface of the base wall 72. The liner 14 has smooth, large-contoured surfaces and a rolled top that allows material to flow out when dumped.

Figure 17:
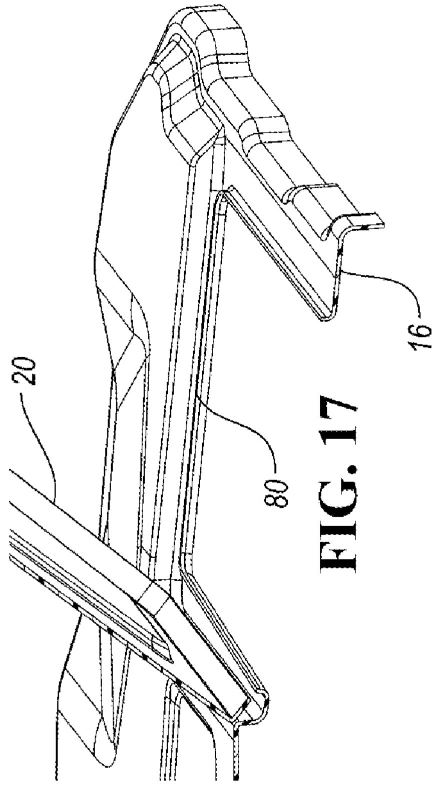
FIG. 17 is an enlarged view of the lid and sub-lid of FIG. 15 with the sub-lid in the open position.
Figure 15:
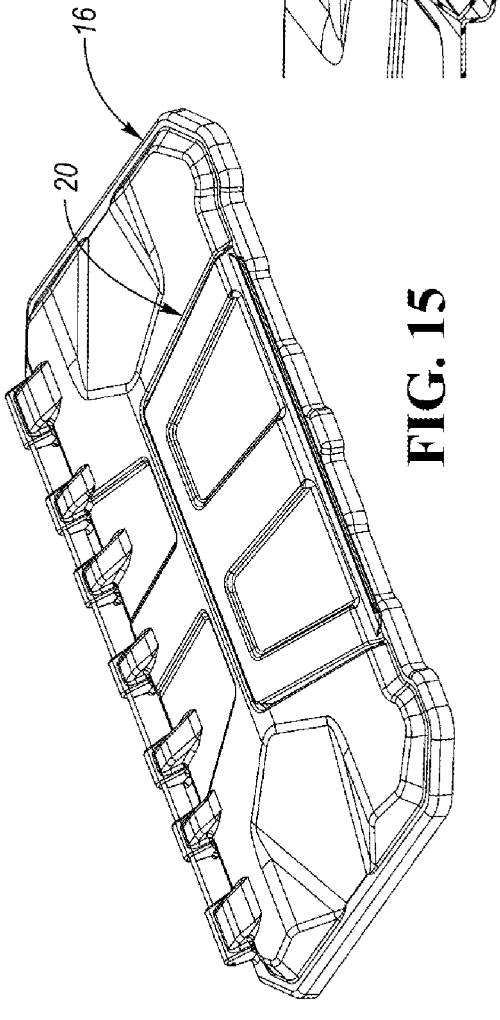
FIG. 15 is a perspective view of the lid and sub-lid of the container of FIG. 1.
Figure 16:
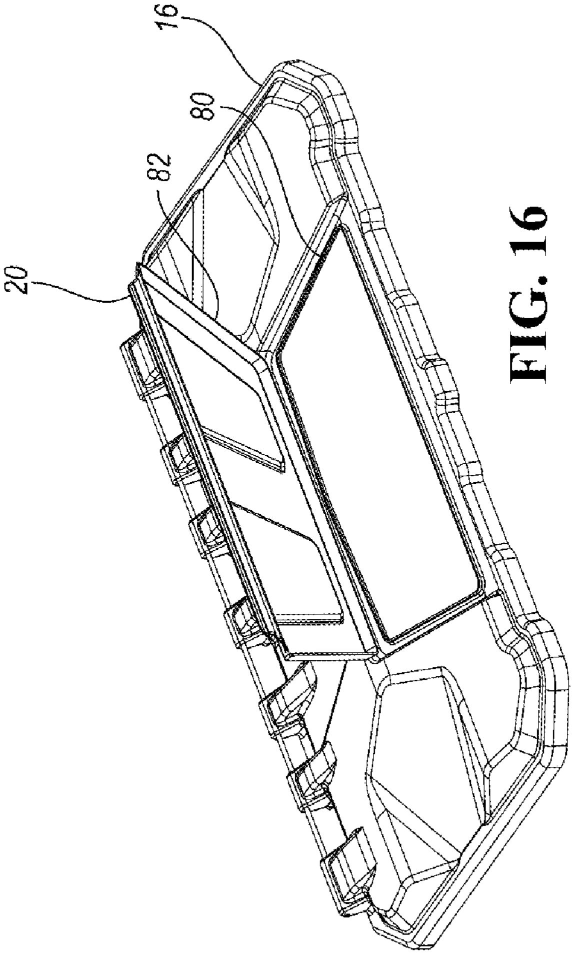
FIG. 16 is a perspective view of the lid of FIG. 15.

FIGS. 15-17 show the lid 16 and sub-lid 20. The sub-lid 20 is hingeably secured to the lid 16 adjacent an opening through the lid 16. A perimeter rib 80 projects upward from the lid 16 about the perimeter of the opening through the lid 16. A lip 82 projects downward from a perimeter of the sub-lid 20 and is outward of the perimeter rib 80 when the sub-lid 20 is closed. The lid 16 and sub-lid 20 are pitched forward and nothing impedes the flow of water from the sub-lid 20 to the lid 16 and down off the front edge of the lid 16 (FIG. 17).

Figure 19:
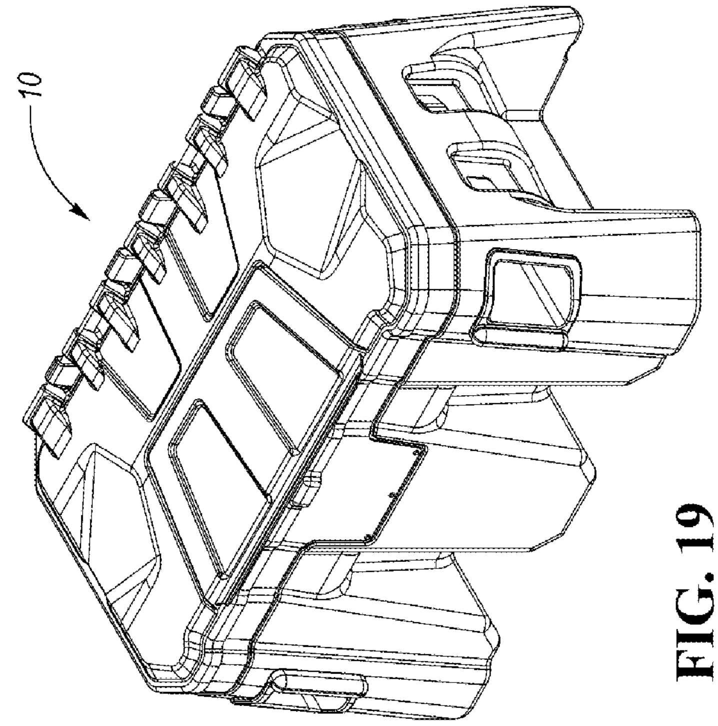
FIG. 19 is a perspective view of the container of FIG. 1.
Figure 18:
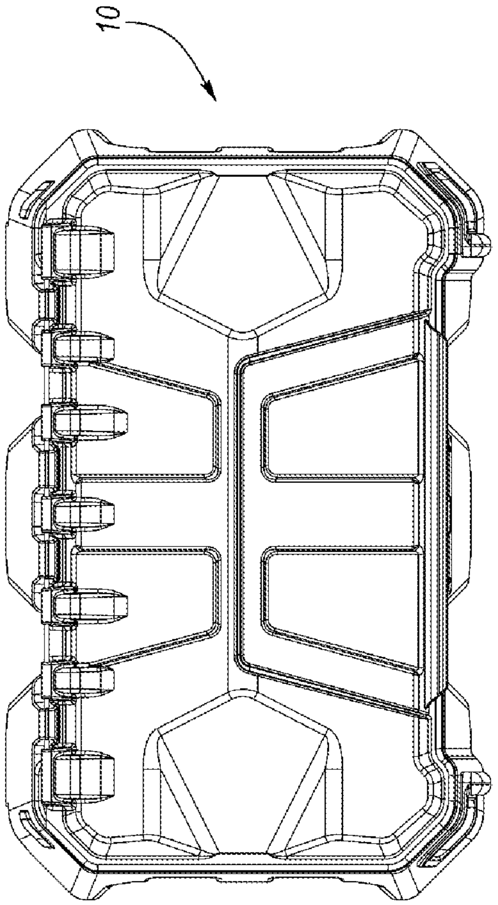
FIG. 18 is a top view of the container of FIG. 1.
Figure 21:
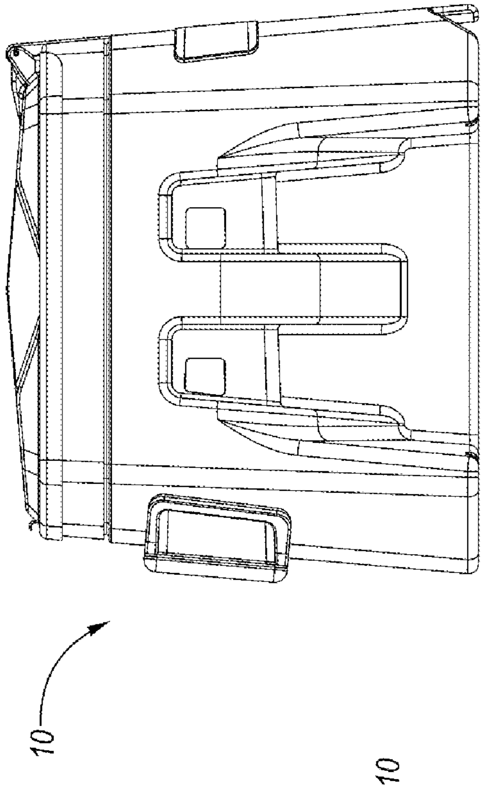
FIG. 21 is a side view of the container of FIG. 1.
Figure 20:
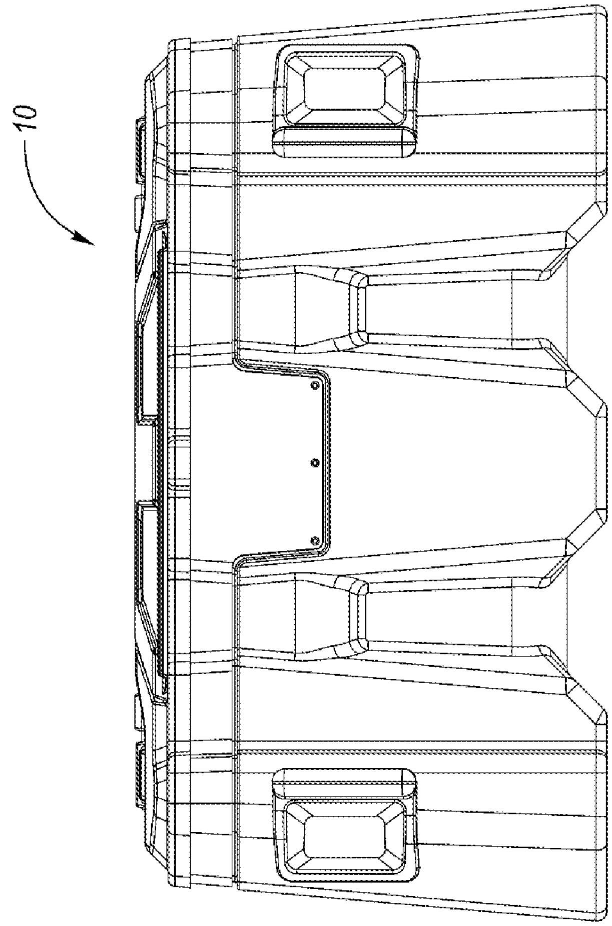
FIG. 20 is a front view of the container of FIG. 1.

FIG. 18 is a top view of the container 10. FIG. 19 is a perspective view of the container 10. FIG. 20 is a front view of the container 10. FIG. 21 is a side view of the container 10.

Figure 22:
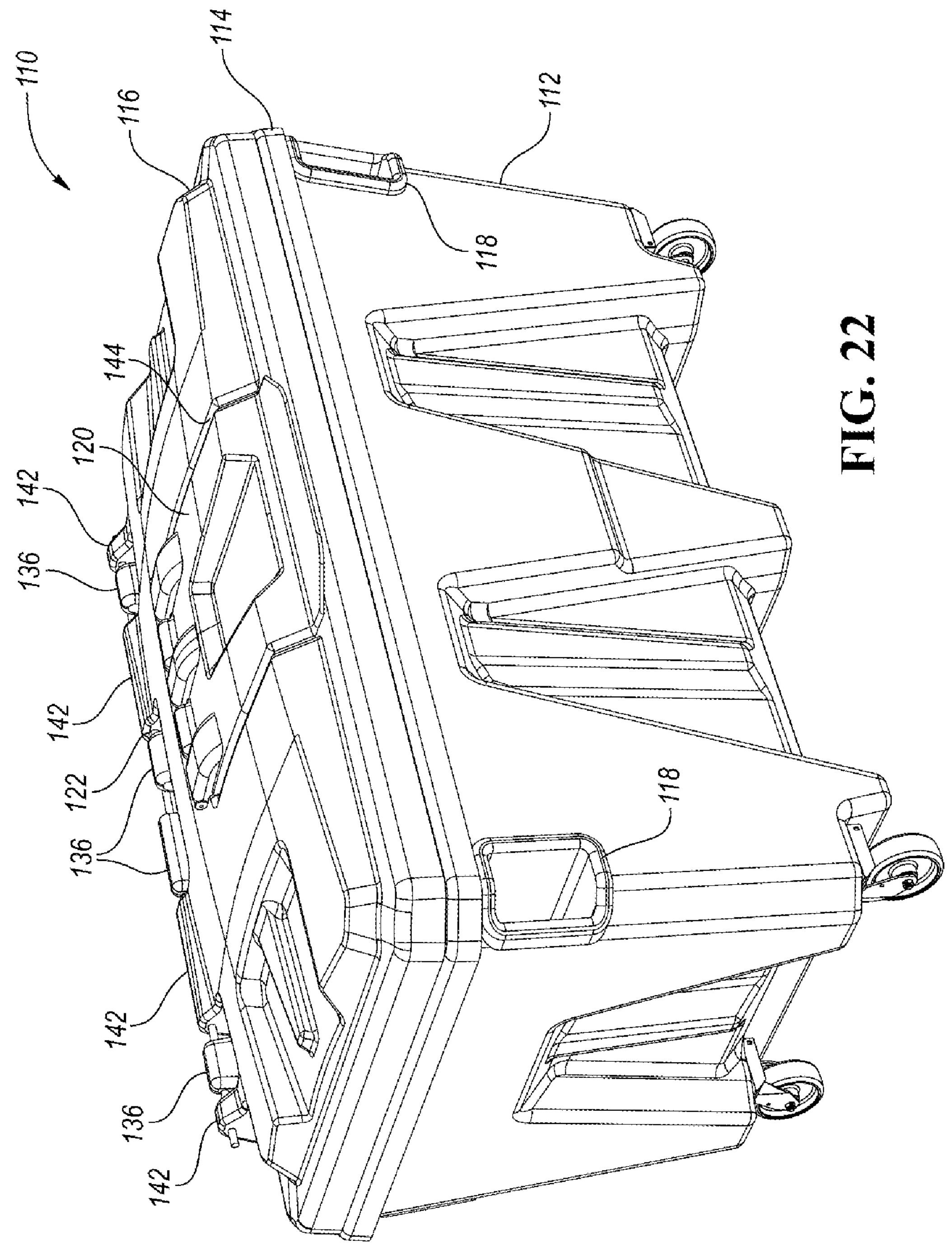
FIG. 22 is a perspective view of a container according to a second embodiment.

A container 110 according to a second embodiment is shown in FIG. 22. The container 110 includes a base 112 supporting a liner 114. An opening to the liner 114 and base 112 is selectively covered by a lid 116 having a sub-lid 120 covering a smaller opening 144 therein. The lid 116 is hingeably connected to the base 112 by a hinge assembly 122 comprising hinge members 136 integral with the base 112 and complementary hinge members 142 integral with the lid 116. A pair of sleeves 118 reinforce fork tine openings though the base 112.

Figure 23:
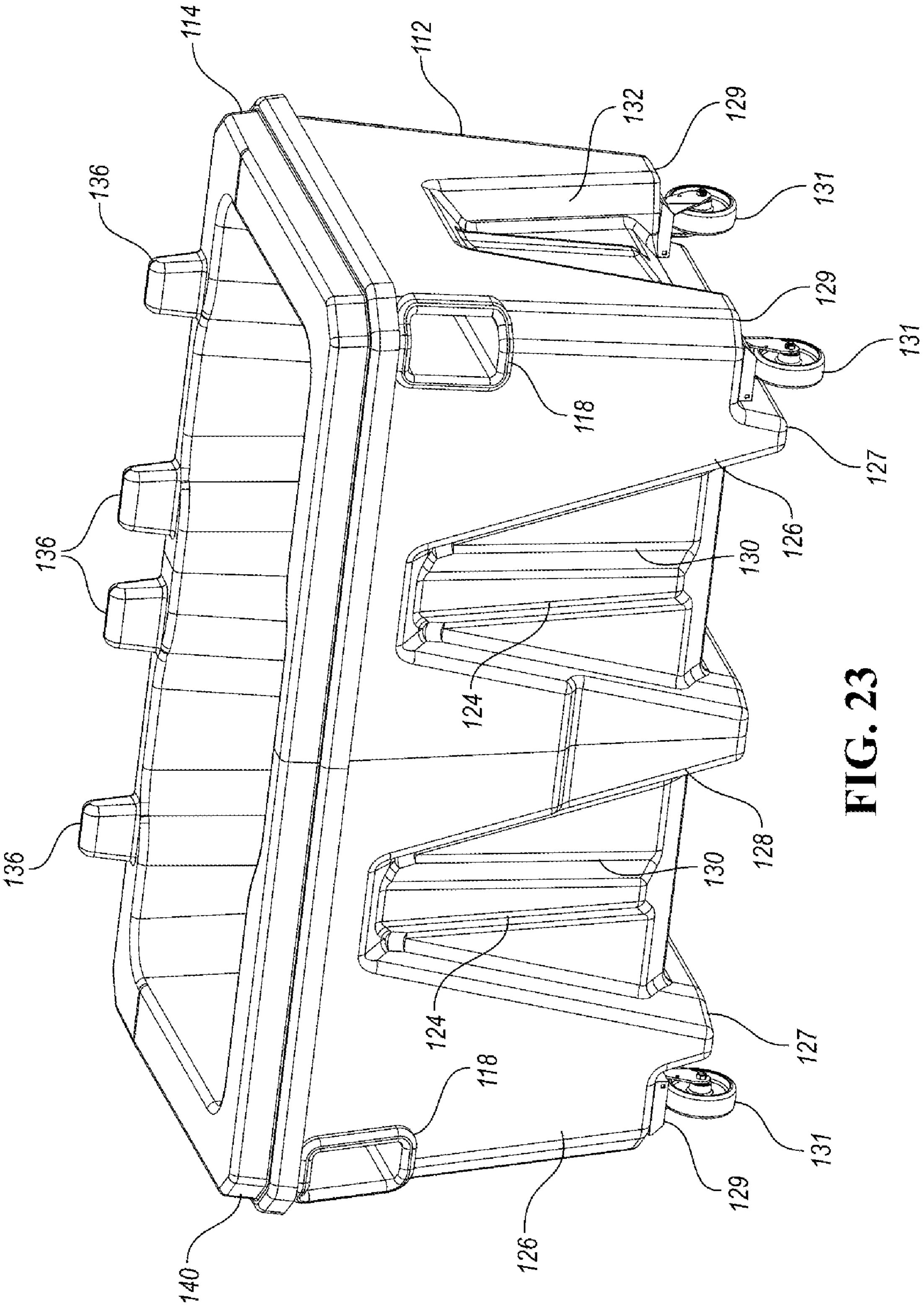
FIG. 23 is a front perspective view of the container of FIG. 22 without the lid.

FIG. 23 is a front perspective view of the container 110 without the lid 116. The base 112 includes a plurality of “corrugations” or alternating projections/recesses about its perimeter, which give it strength to support the weight of the organic material (or other dense material). On the front wall of the base 112 (the rear wall would be the same), the corrugations are vertically oriented and include outer projections 126 and a center projection 128, with recesses 130 between the outer projections 126 and the center projection 128. The recesses 130 are tapered such that they are wider at the bottom and narrower at the top. The projections 126, 128 are tapered complementarily. In the center of each recess 130 is an interior projection 124 projecting outward, but less than the outer projections 126 and center projection 128. Lateral recesses 132, also tapered more narrowly at the top, are formed between front and rear outer projections 126 on the sides of the base 112.

The underside of the base 112 is recessed at outer edges of the outer projections 126 forming recesses 129 for receiving casters 131. This leaves a lowermost portion 127 of each outer projection 126 just inward of each recess 129.

Figure 24:
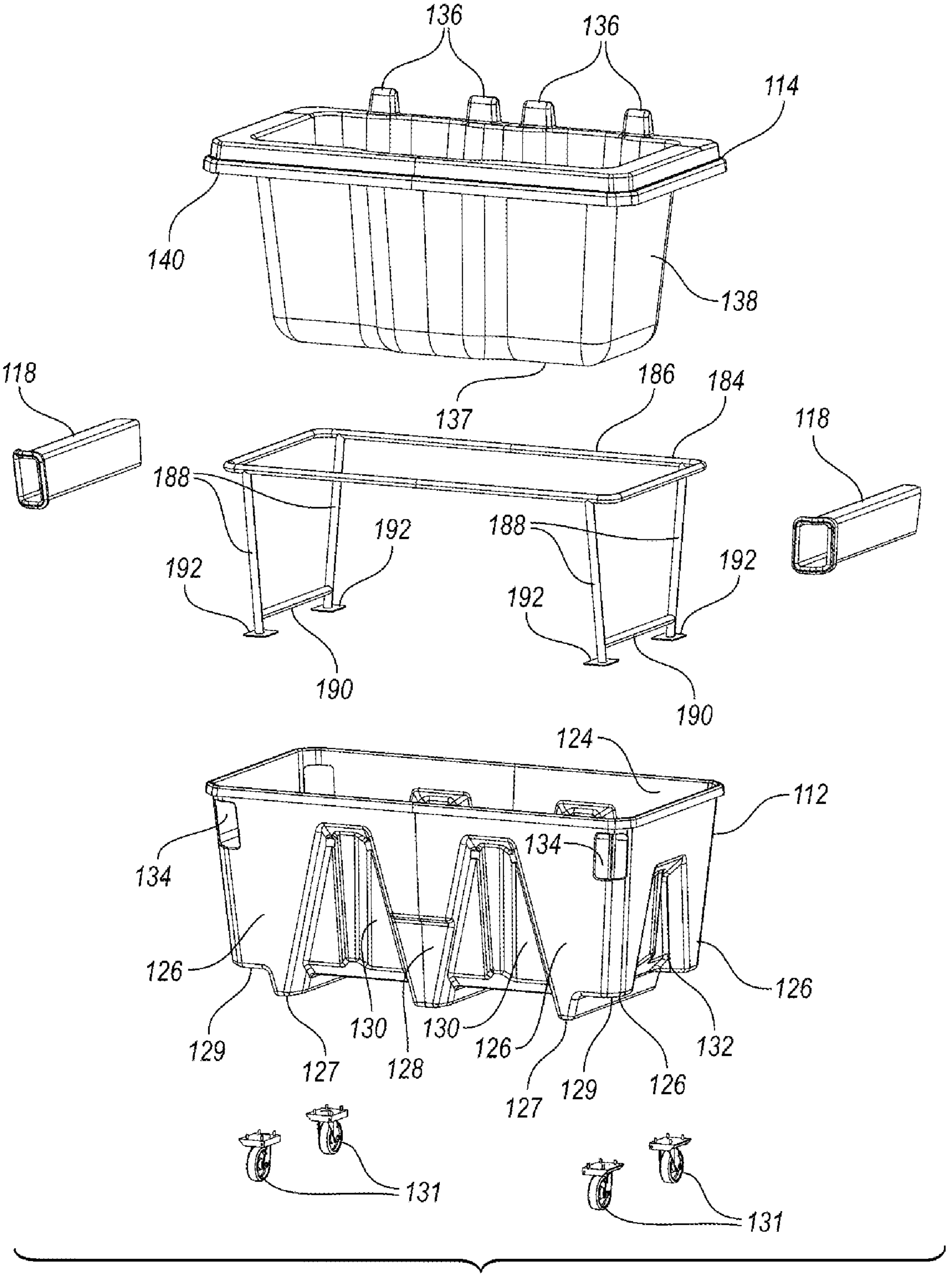
FIG. 24 is an exploded view of the container components of FIG. 23.

FIG. 24 is an exploded view of the container 110 of FIG. 23 (again without the lid 116). Horizontal sleeve openings 134 are formed through the base 112 through the outer projections 126 through the front wall and the rear wall. The hinge members 136 project upward from a rear upper edge of the base 112. In this embodiment, the base 112 is thermoformed as a single piece of plastic.

The liner 114 is also thermoformed as a single piece of plastic and includes a base 137, walls 138 extending upward from the base 137, and a lip 140 at upper ends of the walls 138. Hinge members 136 project upward from the rear wall 138. The sleeves 118 are hollow and tapered and may be injection molded from a tougher plastic material or composite than the rest of the container 110.

As shown, an optional frame 184 may be included between the base 112 and the liner 114. The frame 184 may be metal, such as aluminum or steel tubing, or may be a composite material. The frame 184 includes an upper peripheral rail 186 extending continuously about the periphery of the frame 184. A pair of legs 188 extend downward from each end of the peripheral rail 186. The legs 188 are angled inward toward one another as they extend down to base plates 192. A cross beam 190 extends from one leg 188 to the other at each end of the frame 184 just above the base plates 192.

Figure 25:
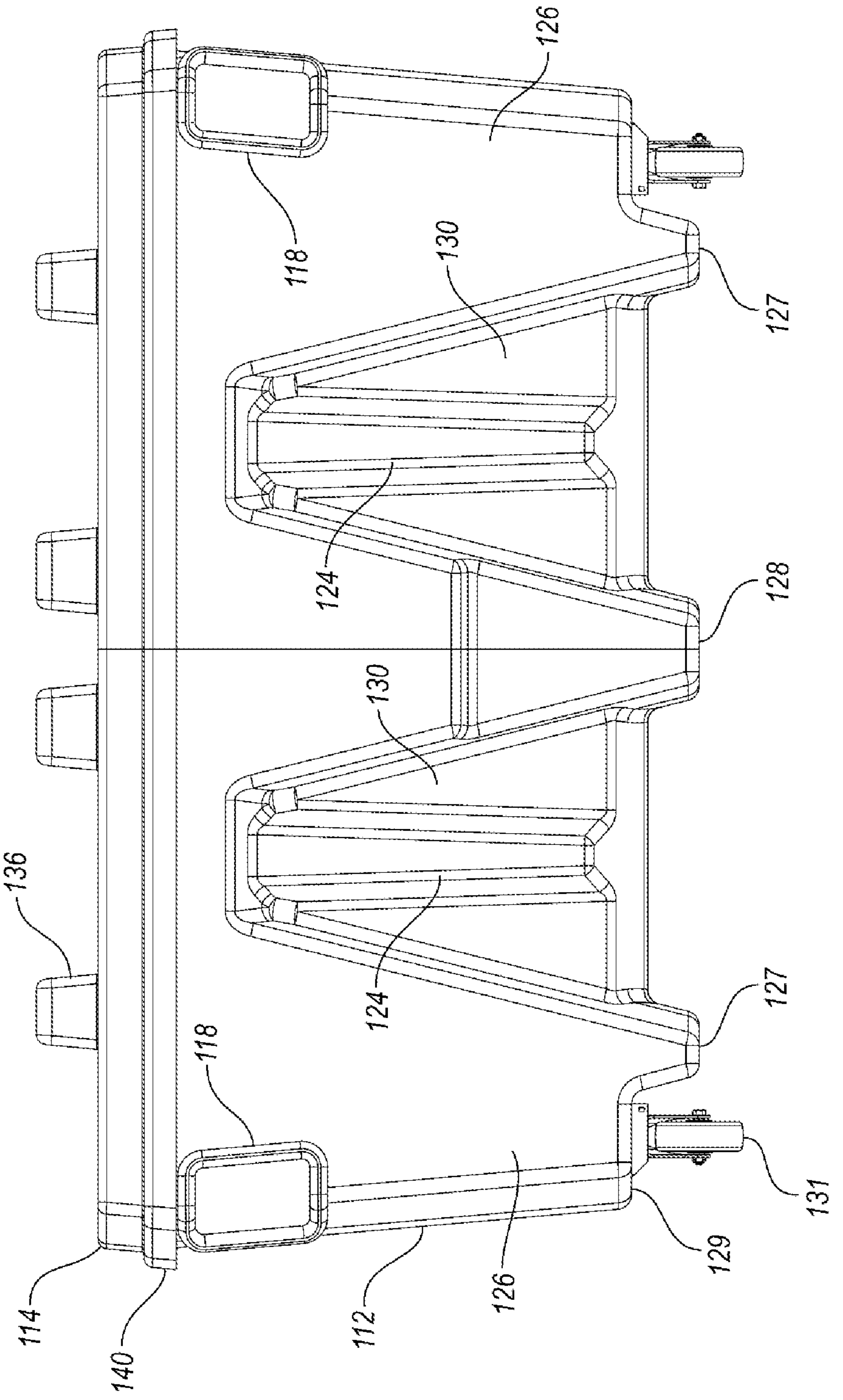
FIG. 25 is a front view of the container components of FIG. 23.

FIG. 25 is a front view of the container 110 of FIG. 23 (without the lid 116). Tine-receiving recesses are formed at the bottom of the container 110 between the lowermost portions 127 of each outer projection 126 and the center projection 128.

Figure 26:
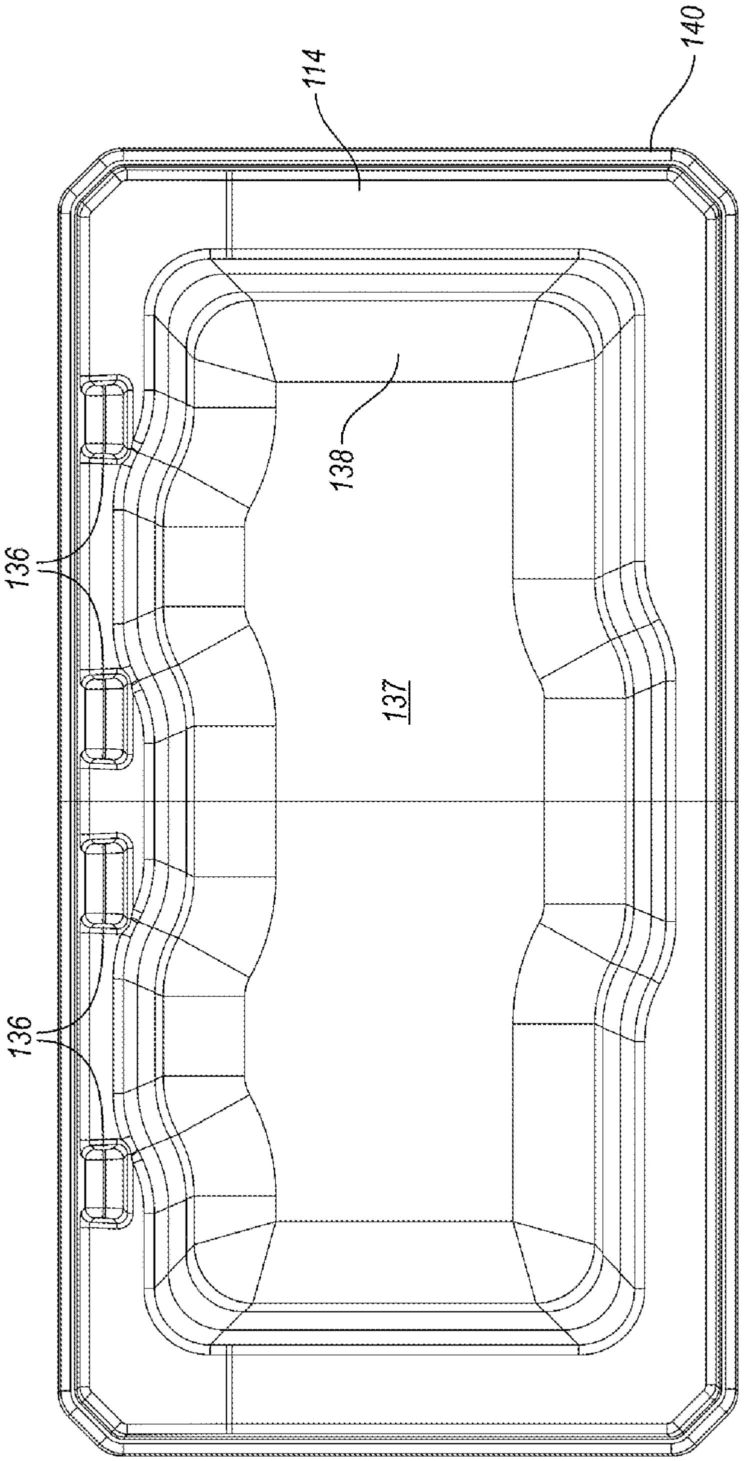
FIG. 26 is a top view of the container components of FIG. 23.

FIG. 26 is a top view of the container 110 of FIG. 23 (without the lid 116). Only the liner 114 is visible. The walls 138 extend upward and taper outward from the base 137. The walls 138 of the liner 114 include gentle contours smoothly following the corrugations of the base 112 (FIG. 25), so that nothing will become stuck or trapped in the liner 114 when the container 110 is inverted to empty the container 110.

Figure 27:
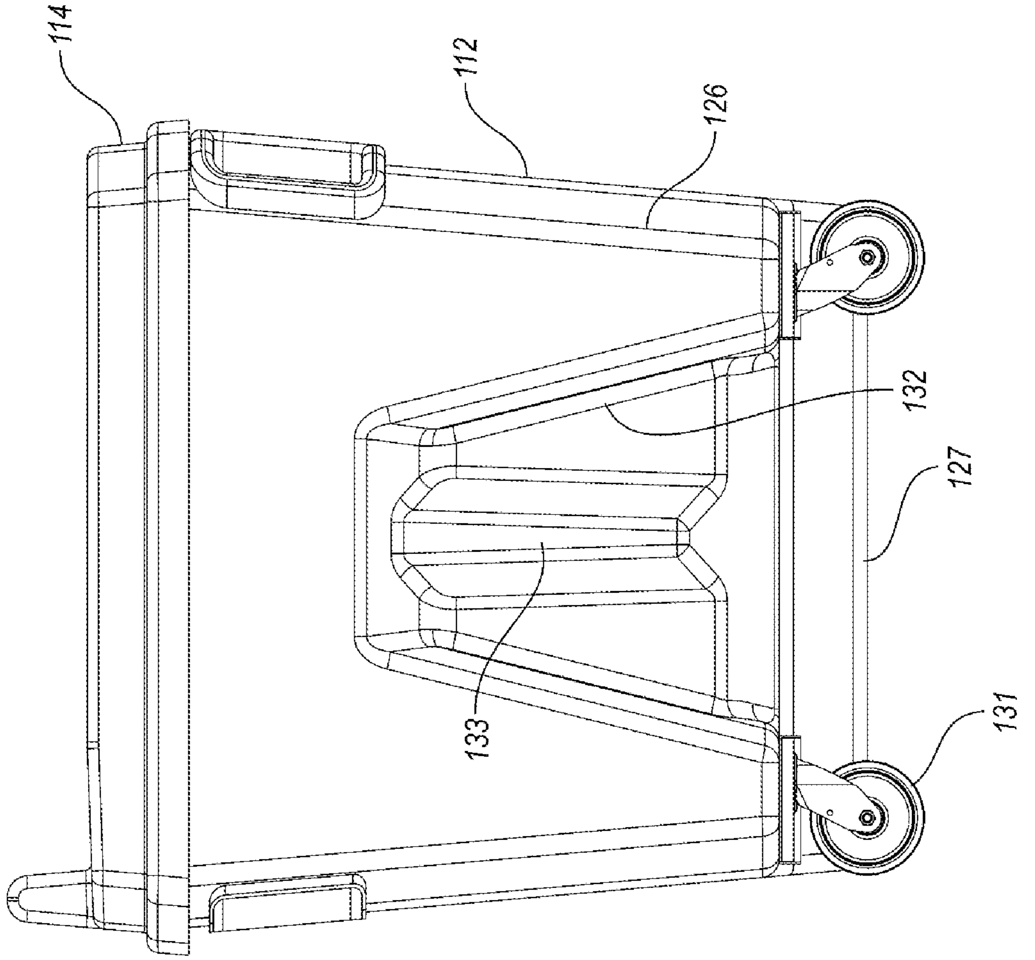
FIG. 27 is a side view of the container components 110 of FIG. 23.

FIG. 27 is a side view of the container 110 of FIG. 23 (without the lid 116). The other side would be a mirror image. An interior projection 133 projects outward from the center of the lateral recess 132, but not as far as the outer projection 126.

Figure 28:
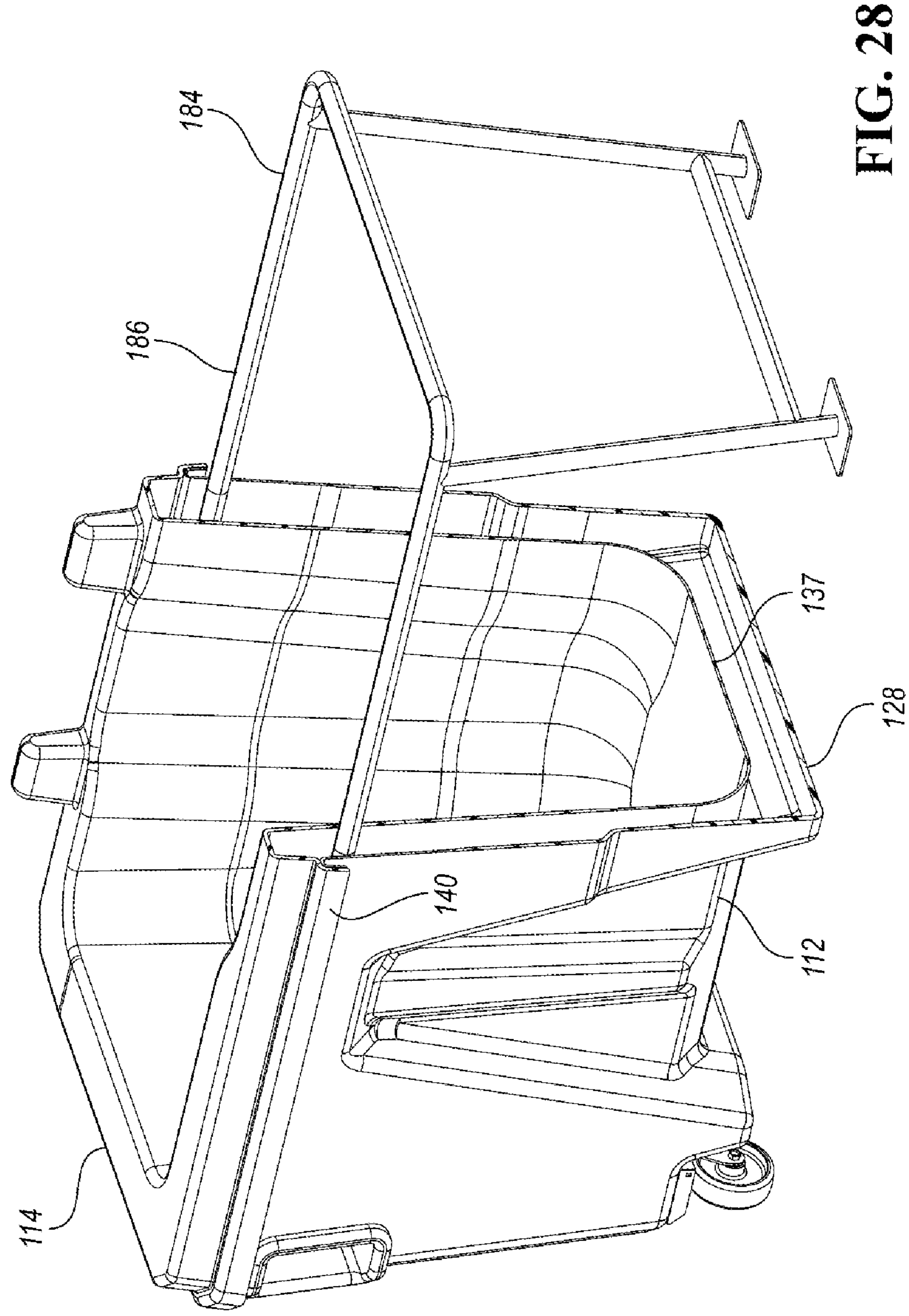
FIG. 28 shows the container components of FIG. 23 with the base and liner partially broken away to show the frame.
Figure 29:
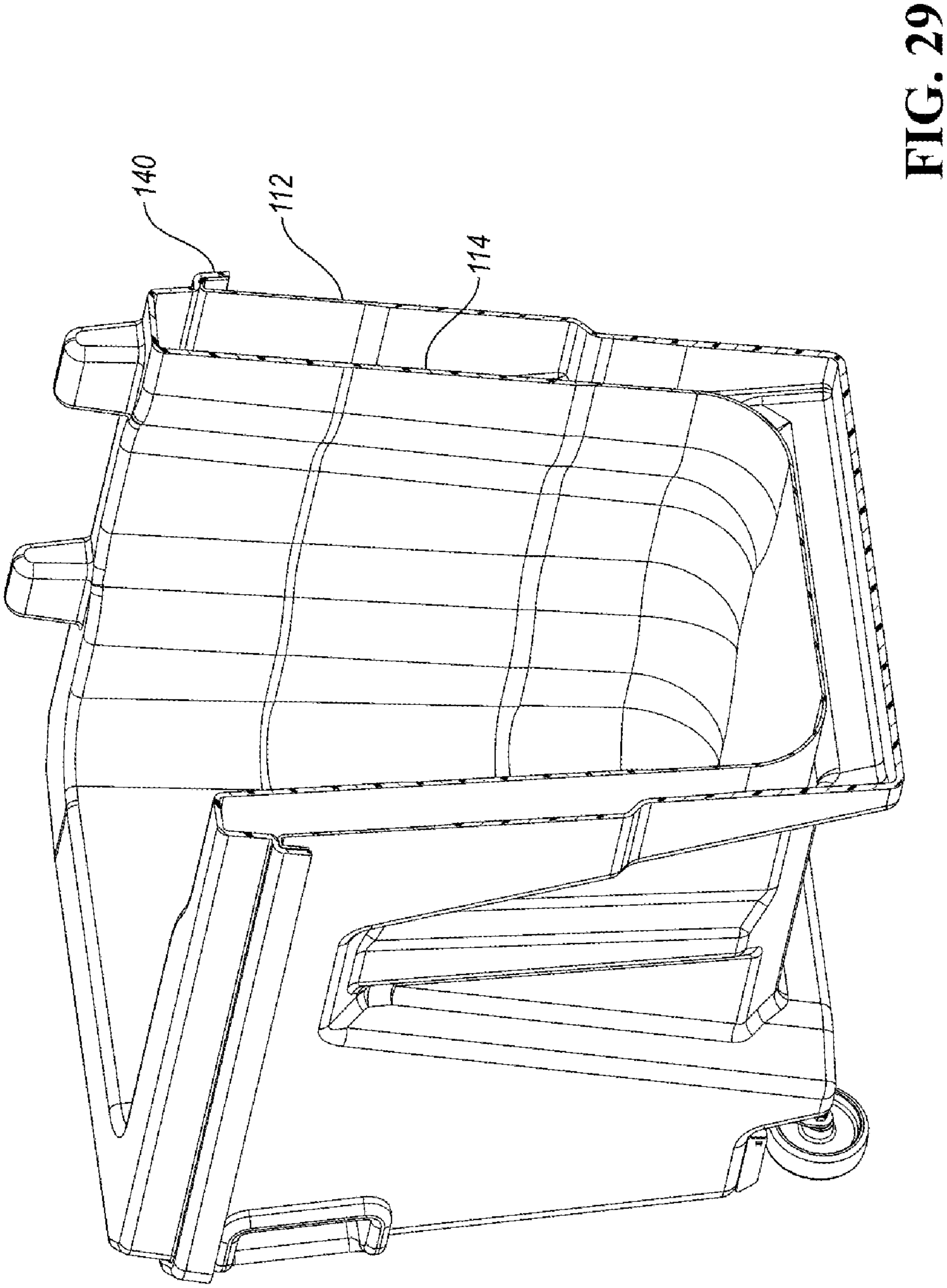
FIG. 29 shows the base and liner of FIG. 28 without the frame.

FIG. 28 shows the container 110 of FIG. 23 without the lid 116, with the base 112 and liner 114 partially broken away to show the frame 184. The upper rail 186 is positioned between the base 112 and the liner 114. FIG. 29 shows the base 112 and liner 114 of FIG. 28 without the frame 184. The base 137 of the liner 114 contacts the base 112 in some places such that base 137 of the liner 114 is supported by the base 114. The liner 114 may be secured to the base 112 by a plurality of bolts inserted through apertures around the periphery of the lip 140, connecting the lip 140 to the lip of the base 112. Again, these bolts could be removed to remove and replace the liner 114 if damaged.

Figure 30:
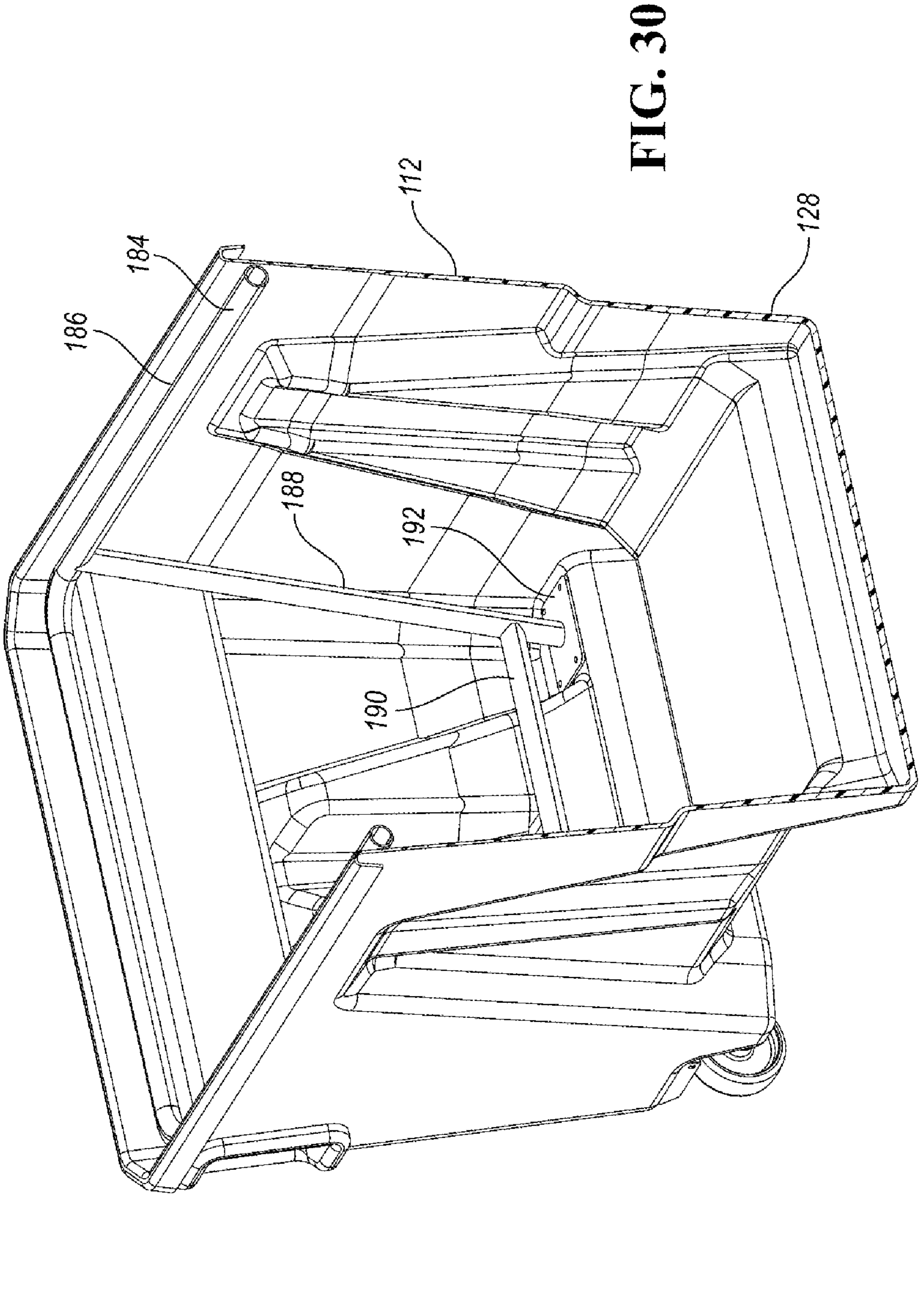
FIG. 30 is an interior perspective view of half the base and frame of FIG. 23 without the liner.

FIG. 30 is an interior perspective view of half the base 112 and frame 184. The sleeve 118 is positioned just under the side of the peripheral rail 186 and supports the peripheral rail 186. The legs 188 extend downward along the inside of the base 112 to the floor plate 192 which abuts the upper surface of the lower wall of the base 112. The cross beam 190 extends across the inside of the end wall of the base 112.

Figure 31:
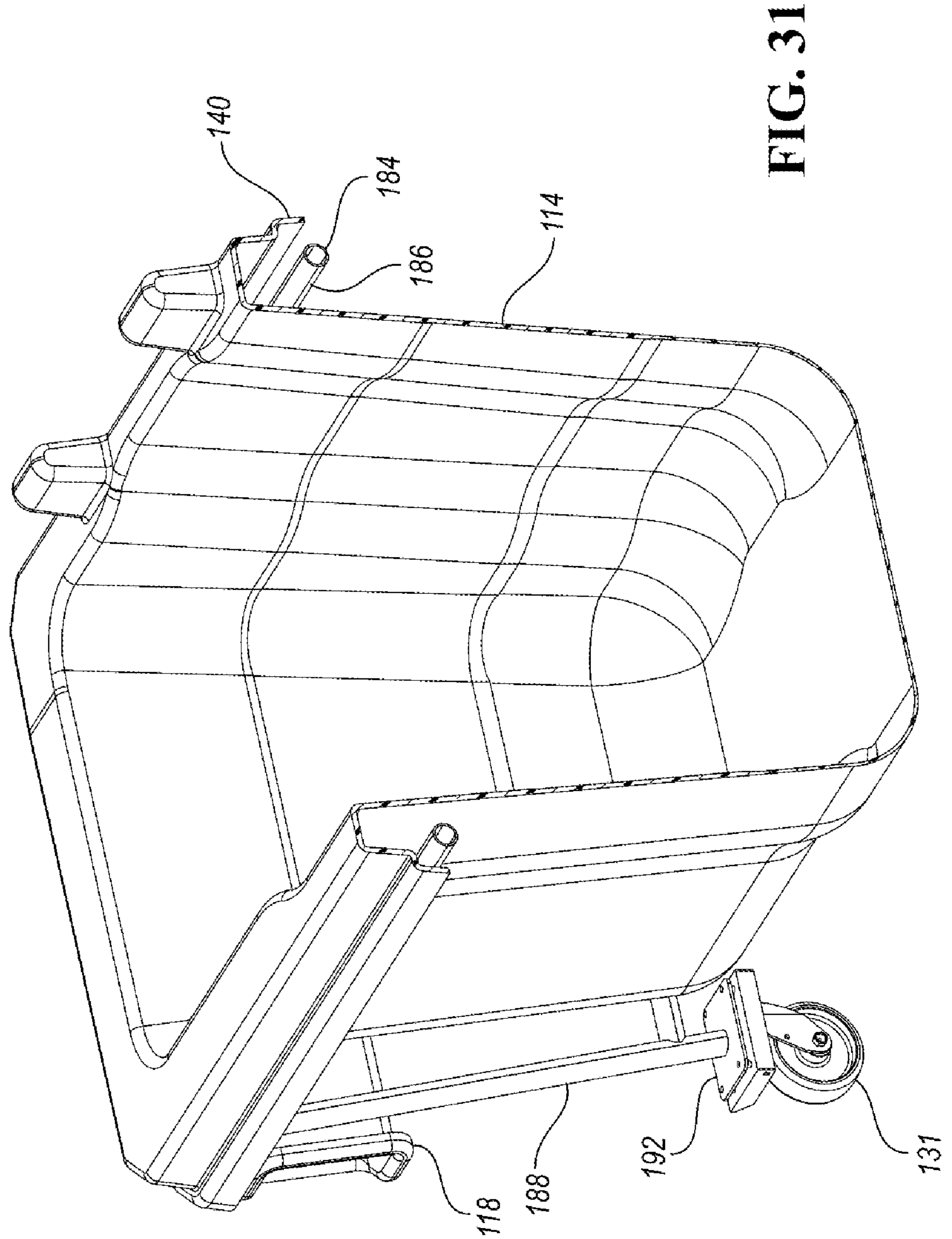
FIG. 31 is an interior perspective view of half the liner and frame of FIG. 23 without the base.

FIG. 31 is an interior perspective view of half the liner 114 and frame 184. The peripheral rail 186 extends around the liner 114 within the lip 140. The legs 188 extend downward along the outside of the liner 114 to the floor plate 192. A caster 131 is secured to each floor plate 192, with the bottom wall of the base 112 (FIG. 30) between the caster 131 and the floor plate 192.

Referring to FIGS. 30 and 31, when tines enter the sleeves 118 and lift the loaded container 110, the sleeve 118 abuts the peripheral rail 186 of the frame 184. The load on the base 137 of the liner 114 is transferred to the base 112 at multiple contact points and then to the floor plates 192. The load is then transferred to the legs 188 and to the peripheral rail 186 and to the sleeves 118. The sleeves 118 also directly contact the base 112 and liner 114 front and rear walls.

Figure 32:
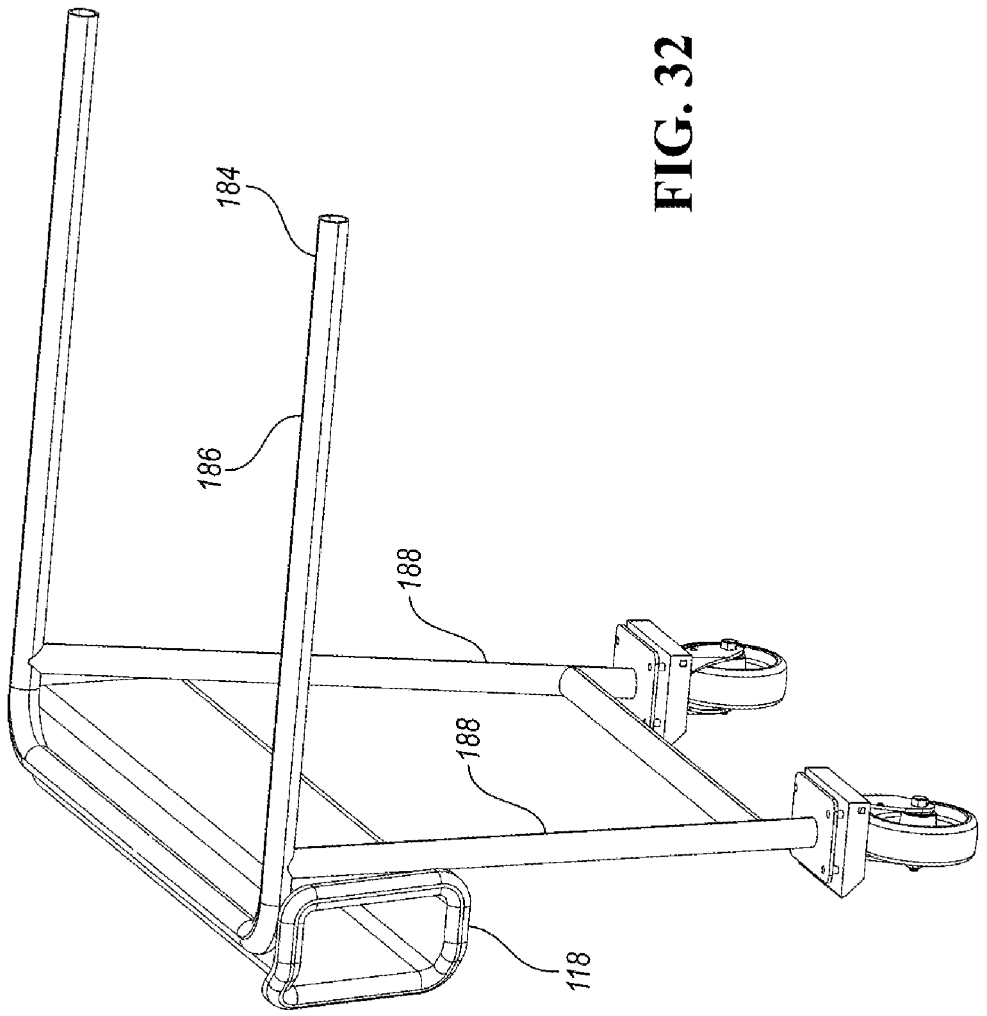
FIG. 32 shows half the frame and sleeve of FIGS. 30 and 31.

FIG. 32 shows the frame 184 and sleeve 118 of FIGS. 30 and 31. The sleeve 118 contacts the underside of the peripheral rail 186 of the frame 184. The other sleeve 118 would do the same on the other side.

Figure 33:
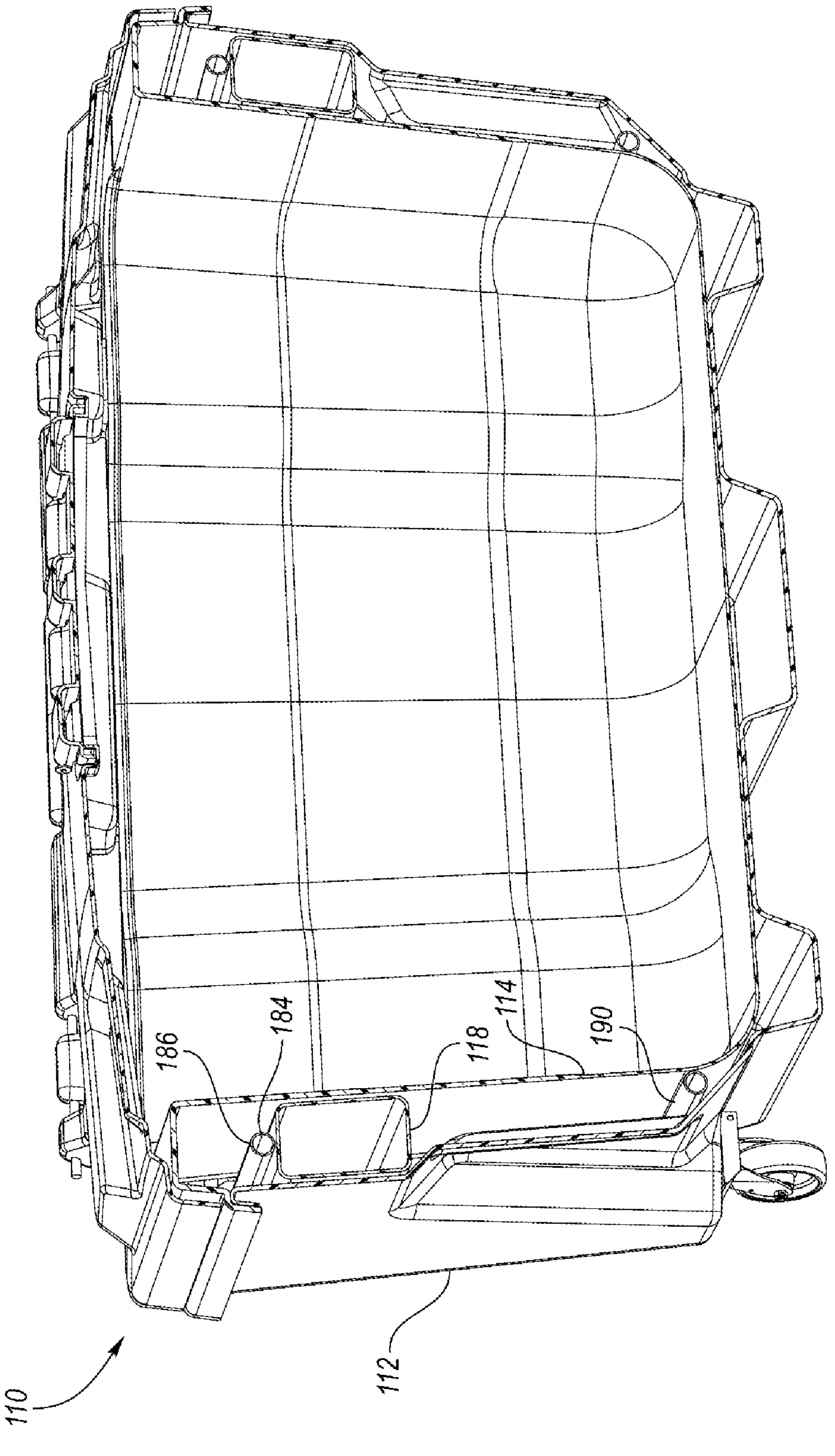
FIG. 33 shows a section view through the container of FIG. 22.

FIG. 33 shows a section view through the container of FIG. 22. The sleeves 118 are secured between the liner 114 on the interior side, the base 112 on the exterior side, the peripheral rail 186 of the frame 184 on the upper surface and the inner surface of the walls forming the lateral recesses 132 below. The cross beam 190 of the frame 184 is also between the liner 114 and the base 112, and abuts a portion of the base 112 below.

Figure 34:
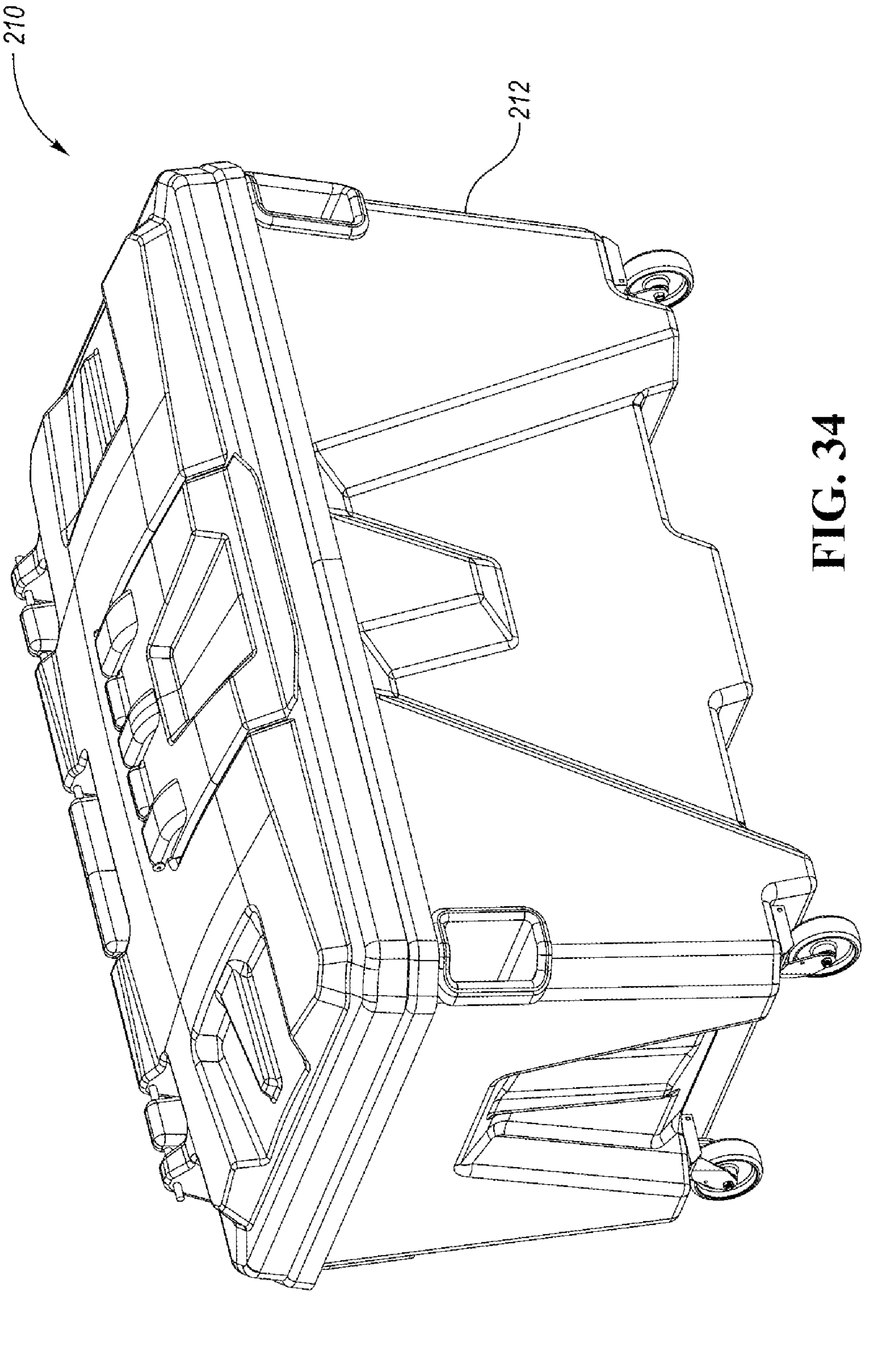
FIG. 34 shows a container according to a third embodiment.

A container 210 according to a third embodiment is shown in FIG. 34. The container 210 is identical to the container 110, except for the configuration of the corrugations in the front wall of the base 212.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A container comprising:
a base having a plurality of vertical corrugations, wherein the plurality of vertical corrugations are on at least a front wall of the base;
a liner received in the base, the liner extending from a bottom wall of the base to an uppermost edge of the base, and wherein the liner is secured to the bottom wall of the base; and
a pair of tine openings extending through the front wall and a rear wall of the base on opposing sides of the base.

2. The container of claim 1 further including a pair of sleeves received in the pair of tine openings.

3. The container of claim 2 wherein the pair of sleeves extend under the liner, wherein each of the pair of sleeves includes an elongated passage therein, wherein the elongated passages extend under the liner.

4. The container of claim 3 wherein the base includes a plurality of walls extending upward from the bottom wall, the plurality of walls including the front wall, the rear wall, and side walls extending between the front and rear walls, and wherein the liner comprises a liner base wall, liner side walls, and a lip formed about a periphery of the liner and projecting outward and downward from an uppermost edge of the liner side walls to a distal end that is spaced from the liner side walls by a gap, the lip extending over upper edges of the plurality of walls of the base.

5. The container of claim 1 further including a frame between the base and the liner, the frame including a peripheral rail that is positioned between an inner surface of the base and an outer surface of the liner.

6. The container of claim 5 further including a pair of sleeves received in the pair of tine openings under the frame, wherein each of the pair of sleeves includes an elongated passage therein, wherein the elongated passages extend under the frame.

7. The container of claim 6 wherein the peripheral rail extends about a periphery of the liner, wherein the peripheral rail extends above the pair of sleeves.

8. The container of claim 7 wherein the frame includes at least one leg extending downward from the peripheral rail to a floor plate connected to the liner.

9. The container of claim 1 wherein the plurality of vertical corrugations include outer projections and a center projection with recesses between the outer projections and the center projection, and wherein the outer projections are tapered such that they are narrower toward bottom portions of the outer projections or wherein the recesses are tapered such that they are wider at a bottom of each recess and narrower at a top of each recess.

10. The container of claim 1 wherein the base comprises a rotomolded component.

11. The container of claim 1 wherein the base comprises a thermoformed component.

12. A container comprising:
a base;
a liner received in the base, wherein the liner extends from a bottom wall of the base to an uppermost edge of the base;
a frame between the base and the liner, the frame including a peripheral rail that is positioned between an inner surface of the base and an outer surface of the liner, and at least one leg extending from the peripheral rail downwardly toward a bottom surface of the base, and wherein the peripheral rail extends about a periphery of the liner;

a pair of tine openings extending through the base; and a pair of sleeves received in the pair of tine openings under the frame wherein each of the pair of sleeves includes an elongated passage therein, wherein the elongated passages extend under the frame.

13. The container of claim 12 wherein the peripheral rail extends above the pair of sleeves and abuts the pair of sleeves.

14. The container of claim 12 wherein the at least one leg extends downward from the peripheral rail to a floor plate connected to the liner.

15. A container comprising:

a base, wherein the base comprises a rotomolded component;

a liner received in the base;

a frame between the base and the liner, the frame including a peripheral rail that is positioned between an inner surface of the base and an outer surface of the liner, and at least one leg extending from the peripheral rail downwardly toward a bottom surface of the base; and a pair of tine openings extending through the base.

16. The container of claim 12 wherein the base comprises a thermoformed component.

17. A container comprising:

a base having a plurality of vertical corrugations;

a liner received in the base, wherein the liner extends from a bottom wall of the base to an uppermost edge of the base;

a frame between the base and the liner;

a pair of tine openings extending through a front wall and a rear wall of the base; and a pair of sleeves received in the pair of tine openings under the frame wherein each of the pair of sleeves includes an elongated passage therein, wherein the elongated passages extend under the frame.

18. The container of claim 17 wherein the frame includes a peripheral rail extending about a periphery of the liner such that the peripheral rail is positioned between an inner surface of the base and an outer surface of the liner, and wherein the elongated passages extend under the frame and support the peripheral rail.

19. The container of claim 17 wherein the base includes a plurality of walls extending upward from the bottom wall, the plurality of walls including the front wall, the rear wall, and side walls extending between the front wall and the rear wall, and wherein liner comprises a liner base wall, liner side walls, and a lip formed about a periphery of the liner and projecting outward and downward from an uppermost edge of the liner side walls to a distal end that is spaced from the liner side walls by a gap, the lip extending over upper edges of the front wall, the rear wall, and the side walls of the base.

20. The container of claim 17 wherein the plurality of vertical corrugations are on at least the front wall of the base, and wherein the plurality of vertical corrugations comprise alternating projections and recesses that include at least first and second outer projections and a center projection between the first and second outer projections with a recess between each of the first and second outer projections and the center projection, and wherein the pair of tine openings are respectively formed through the first and second outer projections.

21. The container of claim 17 wherein the plurality of vertical corrugations are on at least the front wall of the base, and wherein the plurality of vertical corrugations comprise first and second outer projections and a center projection between the first and second outer projections with a recess between each of the first and second outer projections and the center projection, and wherein the first and second outer projections are tapered such that they are narrower toward bottom portions of the first and second outer projections, or the recesses are tapered such that they are wider at a bottom of each recess and narrower at a top of each recess.

22. A container comprising:

a base including a plurality of walls extending upward from a bottom wall, the plurality of walls including a front wall, a rear wall, and side walls extending between the front wall and the rear wall, and including a plurality of vertical corrugations that are formed on at least the front wall and that comprise alternating projections and recesses;

a liner received in the base;

a frame between the base and the liner, the frame including a peripheral rail that is positioned between an inner surface of the base and an outer surface of the liner, and at least one leg extending from the peripheral rail downwardly toward a bottom surface of the base; and a pair of tine openings extending through the base, wherein the pair of tine openings are formed through projections.

23. The container of claim 22 wherein the alternating projections and recesses comprise first and second outer projections and a center projection between the first and second outer projections with a recess between each of the first and second outer projections and the center projection, and wherein the pair of tine openings are respectively formed through the first and second outer projections.

24. The container of claim 1 wherein the plurality of vertical corrugations include outer projections and a center projection with recesses between the outer projections and the center projection, and wherein the recesses have open ends at a bottom of the base.

25. The container of claim 1 wherein the plurality of vertical corrugations extend below a horizontal plane extending through the pair of tine openings.

26. The container of claim 1 wherein the liner comprises a single piece of thermoformed plastic.

27. A container comprising:

a base;

a liner received in the base, wherein the liner includes a lip formed about a periphery of the liner;

a frame between the base and the liner, the frame including a peripheral rail that is positioned between an inner surface of the base and an outer surface of the liner, and wherein the lip extends over the peripheral rail and an uppermost edge of the base;

at least one leg extending from the peripheral rail downwardly toward a bottom surface of the base; and a pair of tine openings extending through the base.

28. The container of claim 27 wherein the base includes a plurality of walls extending upward from a bottom wall, the plurality of walls including a front wall, a rear wall, and side walls extending between the front wall and the rear wall, and wherein the liner comprises a liner base wall, liner side walls, and the lip that is formed about the periphery of the liner, and wherein the lip projects outward and downward from an uppermost edge of the liner side walls to a distal end that is spaced from the liner side walls by a gap, the lip extending over upper edges of the front wall, the rear wall, and the side walls of the base.

29. A container comprising:

a base;

a liner received in the base, wherein the liner is secured to a bottom wall of the base;

a frame between the base and the liner, the frame including a peripheral rail that is positioned between an inner surface of the base and an outer surface of the liner; and a pair of tine openings extending through the base.

30. A container comprising:

a base;

a liner received in the base, wherein the liner comprises a single piece of thermoformed plastic;

a frame between the base and the liner, the frame including a peripheral rail that is positioned between an inner surface of the base and an outer surface of the liner, and at least one leg extending from the peripheral rail downwardly toward a bottom surface of the base; and a pair of tine openings extending through the base.

31. The container of claim 17 wherein the plurality of vertical corrugations extend below a horizontal plane extending through the pair of tine openings.

32. The container of claim 31 wherein the liner comprises a single piece of thermoformed plastic.

33. The container of claim 1 wherein each of the pair of tine openings is open to one of the plurality of vertical corrugations on the front wall of the base.

34. A container comprising:

a base having a plurality of vertical corrugations;

a liner received in the base;

a frame between the base and the liner, wherein the frame includes a peripheral rail extending about a periphery of the liner such that the peripheral rail is positioned between an inner surface of the base and an outer surface of the liner, and wherein the frame includes at least one leg extending from the peripheral rail downwardly toward a bottom surface of the base;

a pair of tine openings extending through a front wall and a rear wall of the base; and a pair of sleeves received in the pair of tine openings under the frame wherein each of the pair of sleeves includes an elongated passage therein, wherein the elongated passages extend under the frame.

35. The container of claim 3 wherein the liner comprises a single piece of thermoformed plastic.

36. A container comprising:

a base;

a liner received in the base;

a frame between the base and the liner, the frame including a peripheral rail that is positioned between an inner surface of the base and an outer surface of the liner, and at least one leg extending from the peripheral rail downwardly toward a bottom surface of the base;

a pair of tine openings extending through the base; and a pair of tine openings that extend through a front wall and a rear wall of the base on opposing sides of the base.

37. The container of claim 36 wherein the at least one leg extends downward along an inside of the base to a floor plate which abuts an upward facing surface of the base.

* * * * *